United States Patent
Hwang et al.

(10) Patent No.: US 11,910,324 B2
(45) Date of Patent: *Feb. 20, 2024

(54) METHOD FOR TRANSMITTING WUS IN WIRELESS COMMUNICATION SYSTEM, AND DEVICE THEREFOR

(71) Applicant: LG ELECTRONICS INC., Seoul (KR)

(72) Inventors: Seunggye Hwang, Seoul (KR); Changhwan Park, Seoul (KR); Joonkui Ahn, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/072,303

(22) Filed: Nov. 30, 2022

(65) Prior Publication Data

US 2023/0092099 A1 Mar. 23, 2023

Related U.S. Application Data

(63) Continuation of application No. 17/266,878, filed as application No. PCT/KR2019/010170 on Aug. 9, 2019, now Pat. No. 11,546,855.

(30) Foreign Application Priority Data

Aug. 9, 2018 (KR) .......... 10-2018-0093431
Sep. 22, 2018 (KR) .......... 10-2018-0114511
May 2, 2019 (KR) .......... 10-2019-0051369

(51) Int. Cl.
*H04W 52/02* (2009.01)
*H04W 68/02* (2009.01)
*H04W 76/28* (2018.01)

(52) U.S. Cl.
CPC ....... *H04W 52/0235* (2013.01); *H04W 68/02* (2013.01); *H04W 76/28* (2018.02)

(58) Field of Classification Search
CPC . H04W 52/0235; H04W 68/02; H04W 76/28; H04W 52/0229; H04W 68/005; H04W 8/24

(Continued)

(56) References Cited

U.S. PATENT DOCUMENTS 11,197,339 B2 12/2021 Nam et al.
11,546,855 B2 1/2023 Hwang et al.
(Continued)

FOREIGN PATENT DOCUMENTS

KR 20150053752 5/2015
WO 2017043767 3/2017
(Continued)

OTHER PUBLICATIONS

PCT International Application No. PCT/KR2019/010170, International Search Report dated Dec. 2, 2019, 17 pages.
(Continued)

*Primary Examiner* — Inder P Mehra
(74) *Attorney, Agent, or Firm* — LEE, HONG, DEGERMAN, KANG & WAIMEY

(57) ABSTRACT

Disclosed are a method for transmitting a wake up signal (WUS) by a communication device in a wireless communication system, and a device therefor, according to various embodiments. Disclosed are a method for transmitting a WUS by a communication device, and a device therefor, the method comprising the steps for: setting a group WUS configuration related to the setting of a WUS resource for each UE group; transmitting the set group WUS configuration; and transmitting a WUS on the basis of the group WUS configuration, wherein the group WUS configuration is divided into a second WUS configuration for discontinuous reception (DRX) and a first WUS configuration for eDRX.

5 Claims, 21 Drawing Sheets

(58) Field of Classification Search
USPC .......................................................... 370/311
See application file for complete search history.

(56) References Cited

U.S. PATENT DOCUMENTS

| | | | |
|---|---|---|---|
| 2015/0312404 A1 | 10/2015 | Abramson et al. | |
| 2018/0054843 A1 | 2/2018 | Stahlin et al. | |
| 2018/0098287 A1 | 4/2018 | Ang et al. | |
| 2019/0349856 A1* | 11/2019 | Liu | H04W 72/0453 |
| 2019/0387572 A1* | 12/2019 | Nam | H04W 52/0235 |
| 2020/0029302 A1 | 1/2020 | Cox et al. | |
| 2020/0045604 A1* | 2/2020 | Allan | H04W 36/165 |
| 2020/0092814 A1* | 3/2020 | Zhou | H04L 1/1835 |
| 2020/0145921 A1 | 5/2020 | Zhang et al. | |
| 2020/0205079 A1 | 6/2020 | Tong et al. | |
| 2020/0267646 A1* | 8/2020 | Nam | H04W 52/0219 |
| 2021/0014825 A1 | 1/2021 | Shi et al. | |

FOREIGN PATENT DOCUMENTS

| | | |
|---|---|---|
| WO | 2018021779 | 2/2018 |
| WO | 2018074766 | 4/2018 |

OTHER PUBLICATIONS

Nokia et al., "Wake-up signal configurations and procedures," R1-1806159, 3GPP TSG RAN WG1 Meeting #93, May 2018, 8 pages.

European Patent Office Application Serial No. 19848473.5, Search Report dated Aug. 9, 2021, 13 pages.

Huawei et al., "Updated feature lead summary of Wake-up signal configurations and procedures in NB-IoT," 1-1807560, 3GPP TSG RAN WG1 Meeting #93, May 2018, 19 pages.

Qualcomm Incorporated, "Further discussion of Wake-up signal functions," R1-1807107, 3GPP TSG RAN WG1 Meeting #93, May 2018, 7 pages.

"IEEE Guide for Wireless Access in Vehicular Environments (WAVE) Architecture," IEEE Std 1609.0-2013, IEEE Standard, IEEE XP068070314, Mar. 2014, 78 pages.

Qualcomm Incorporated, "UE-group wake-up signal for MTC," R1-1904517, 3GPP TSG-RAN WG1 #96bis, Apr. 2019, 5 pages.

U.S. Appl. No. 17/266,878, Office Action dated Jan. 20, 2022, 13 pages.

U.S. Appl. No. 17/266,878, Office Action (Letter Restarting Period for Response) dated Apr. 7, 2022, 11 pages.

U.S. Appl. No. 17/266,878, Notice of Allowance dated Aug. 23, 2022, 11 pages.

* cited by examiner

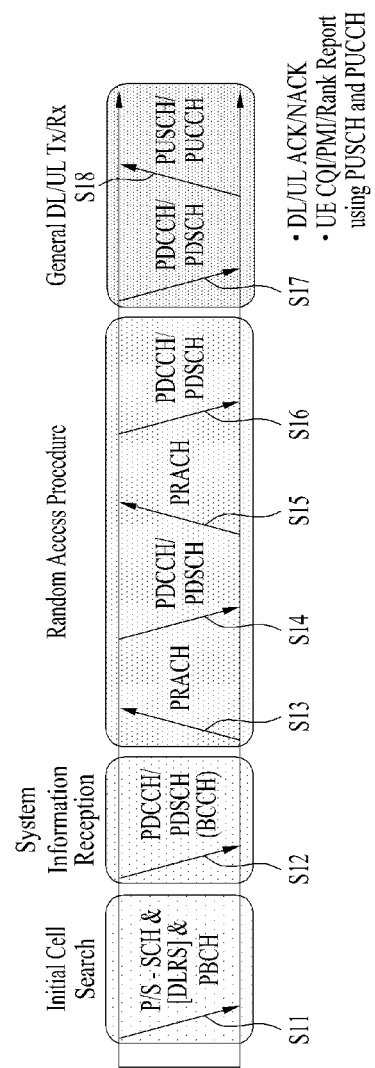

[FIG. 2]
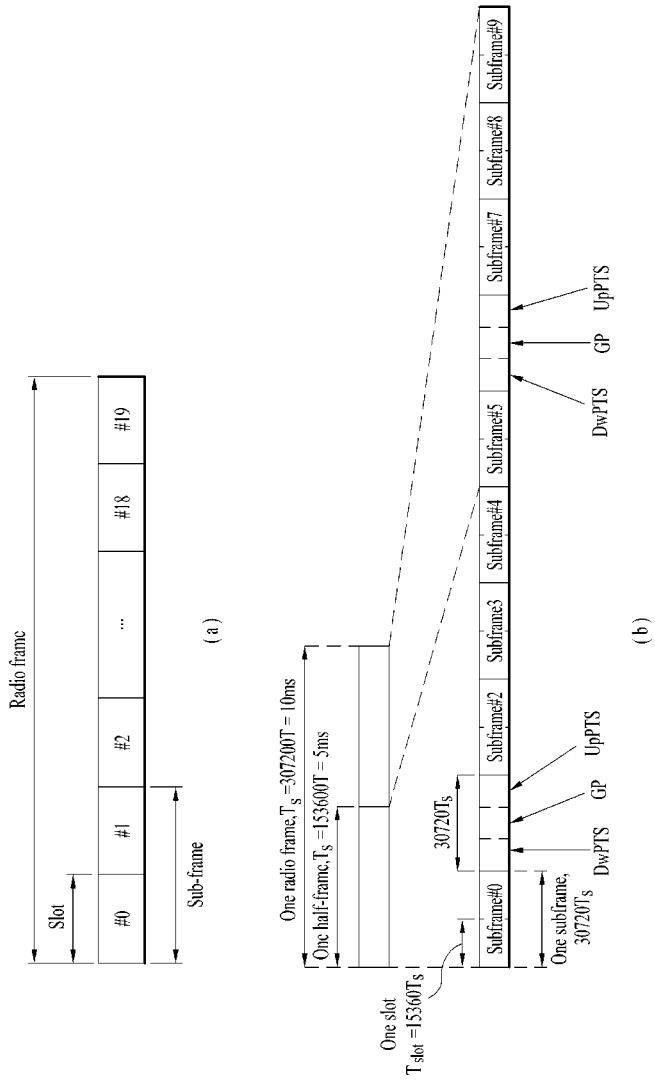

[FIG. 3]
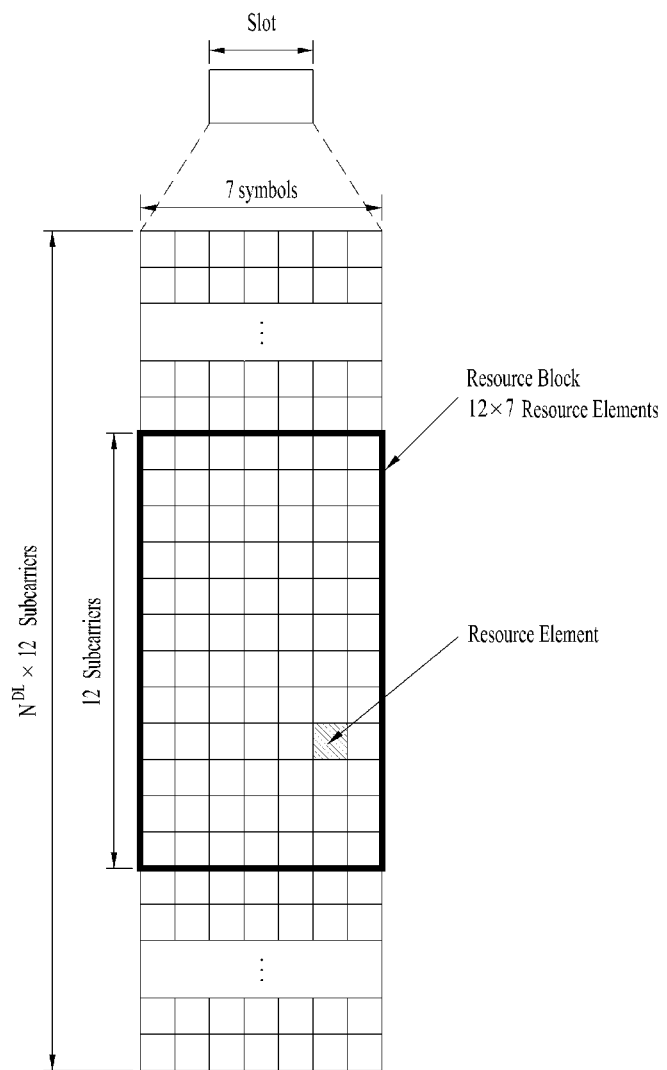

[FIG. 4]
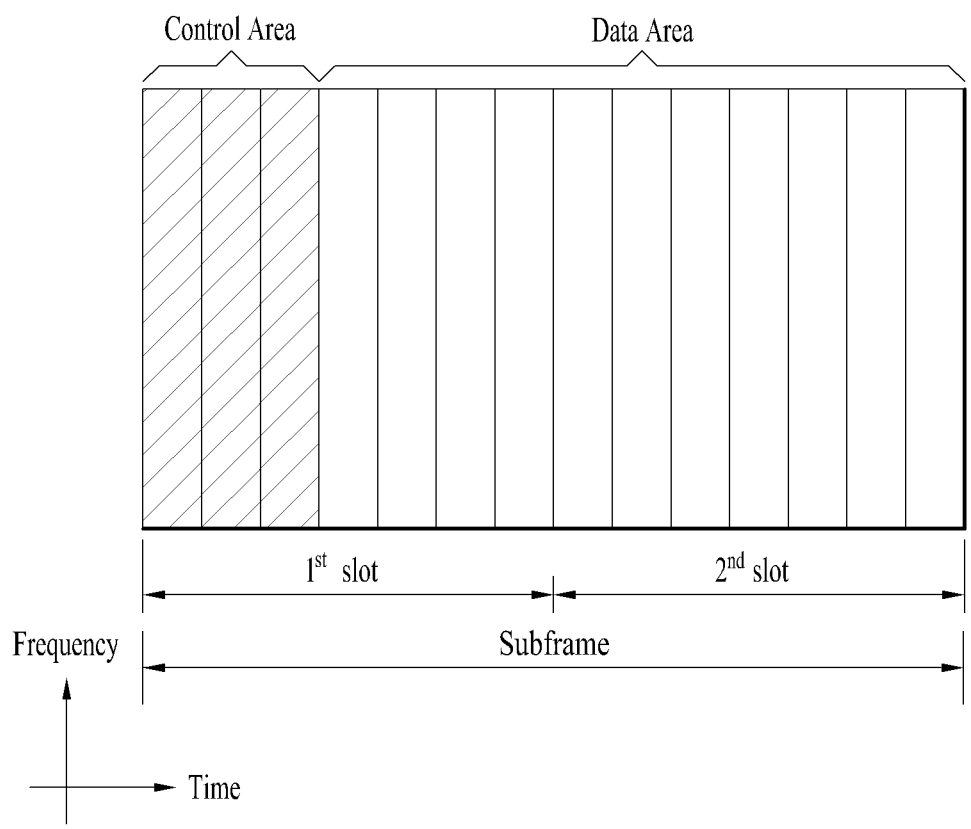

[FIG. 5]
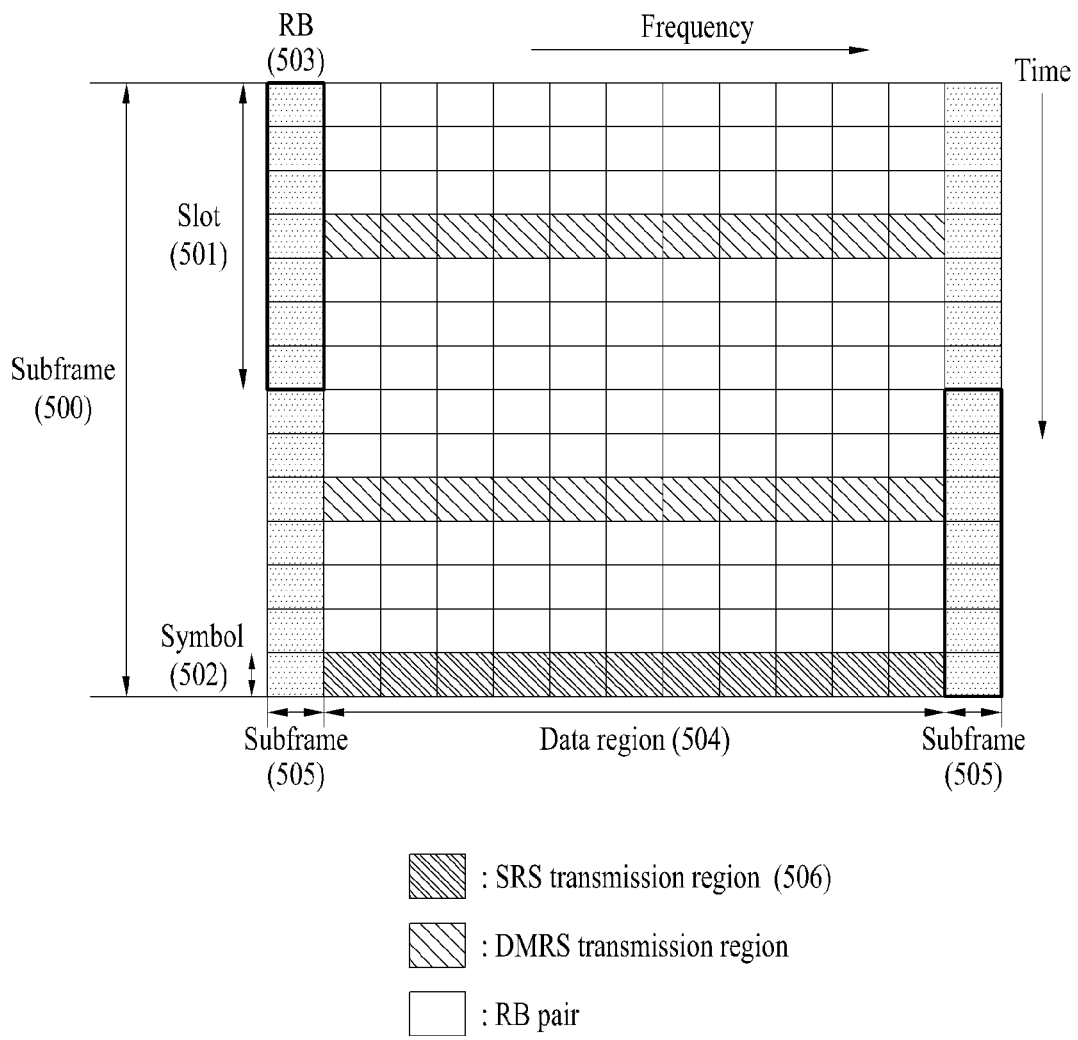

[FIG. 6]
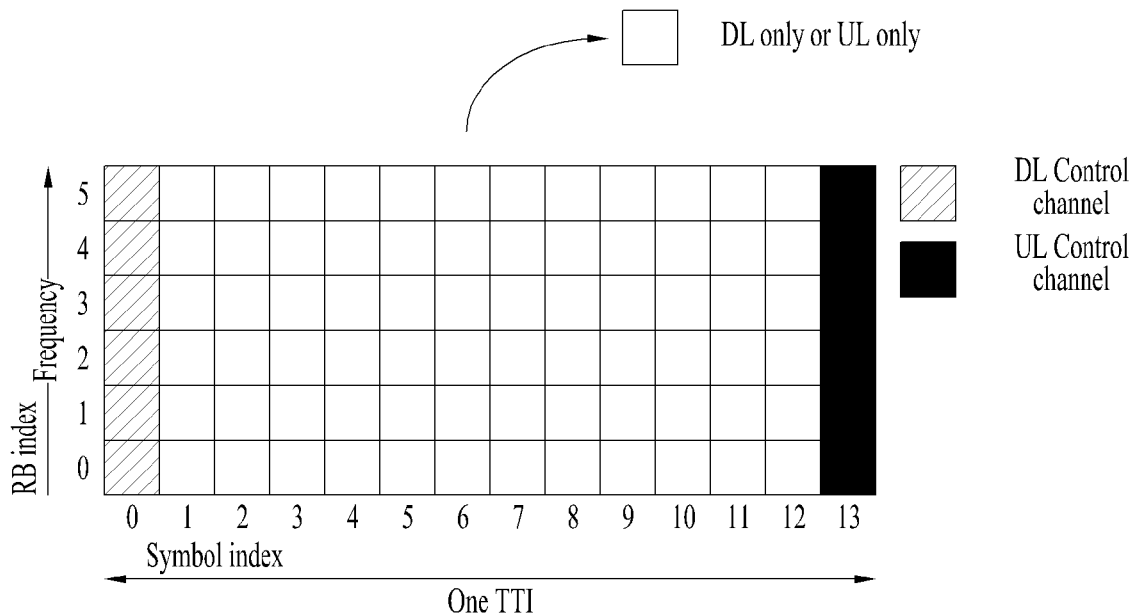
[FIG. 7]
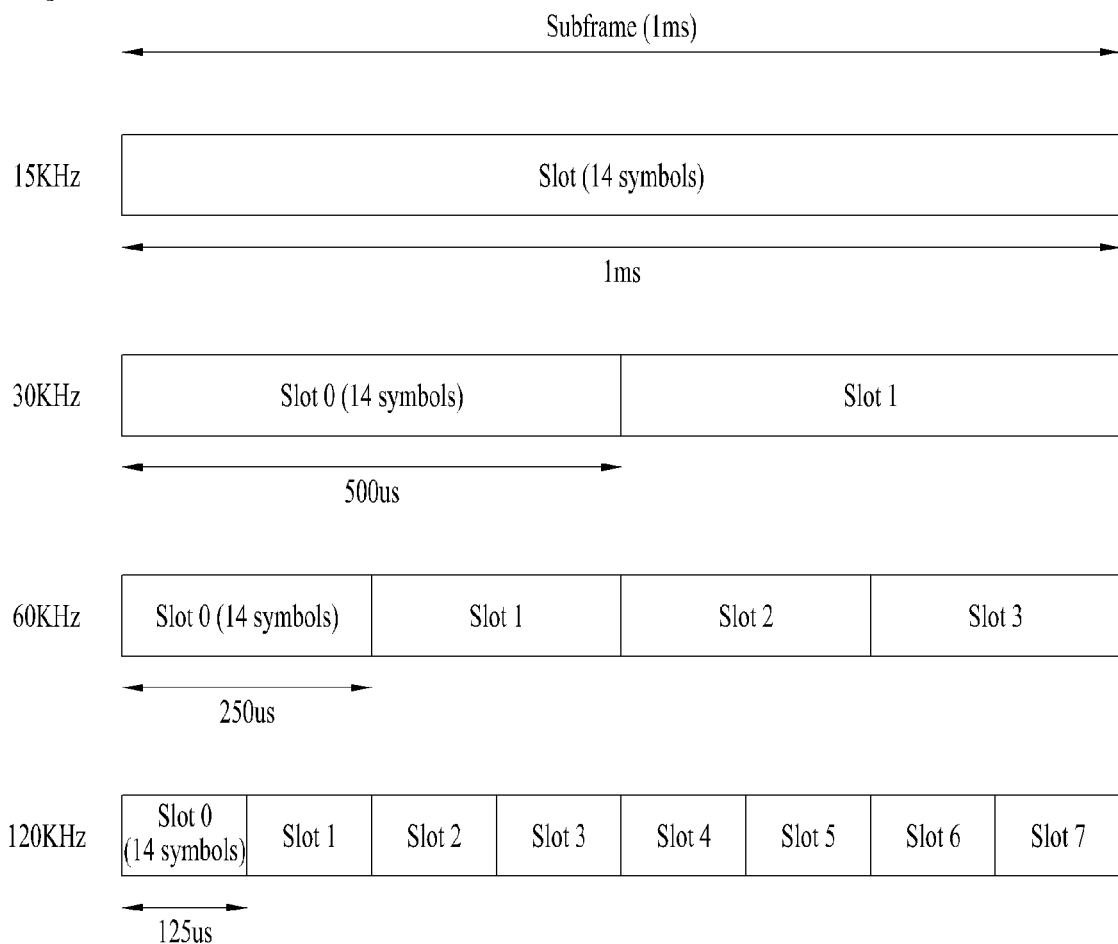

[FIG. 8]
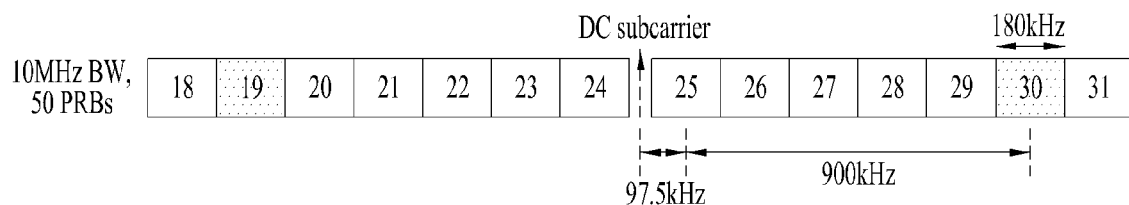
[FIG. 9]
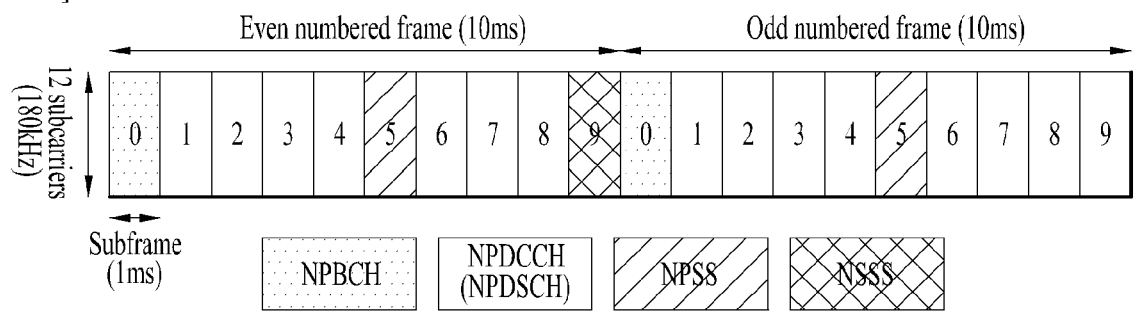
[FIG. 10]
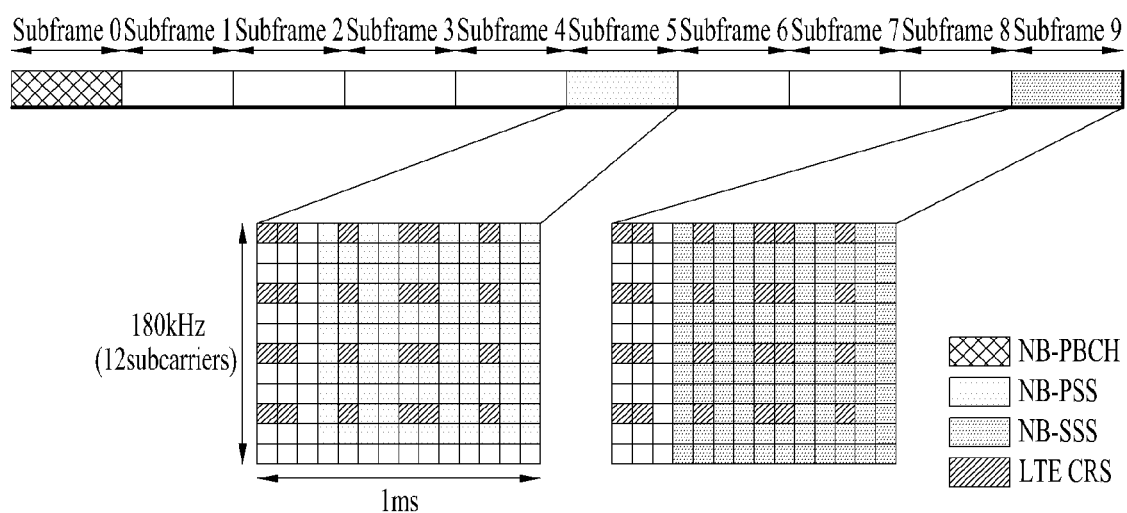

[FIG. 11]
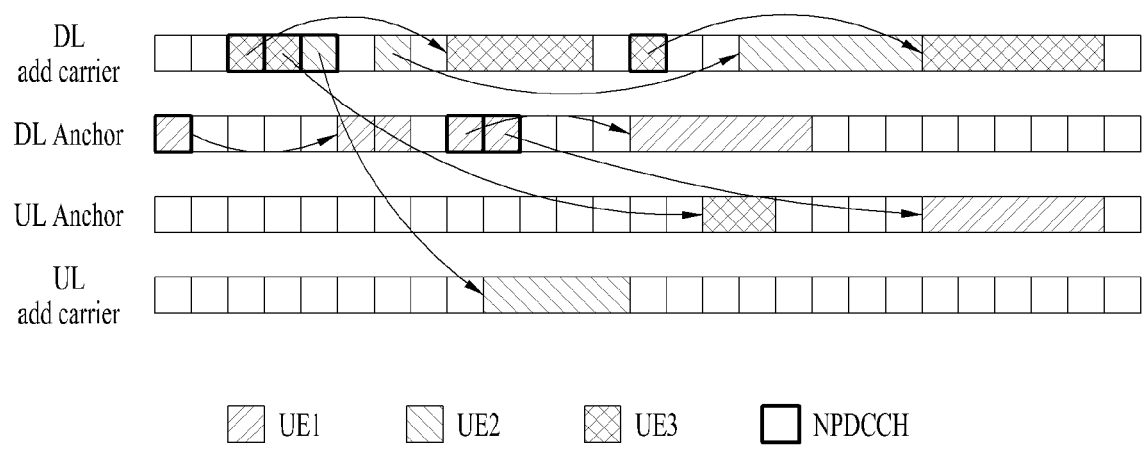

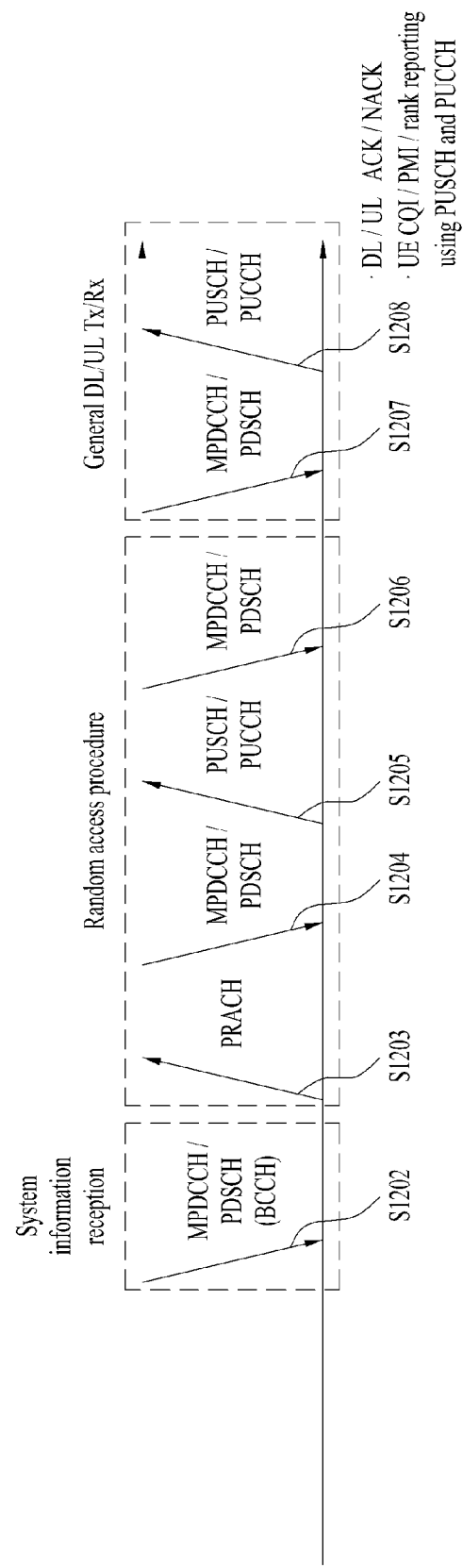
[FIG. 12]

[FIG. 13]
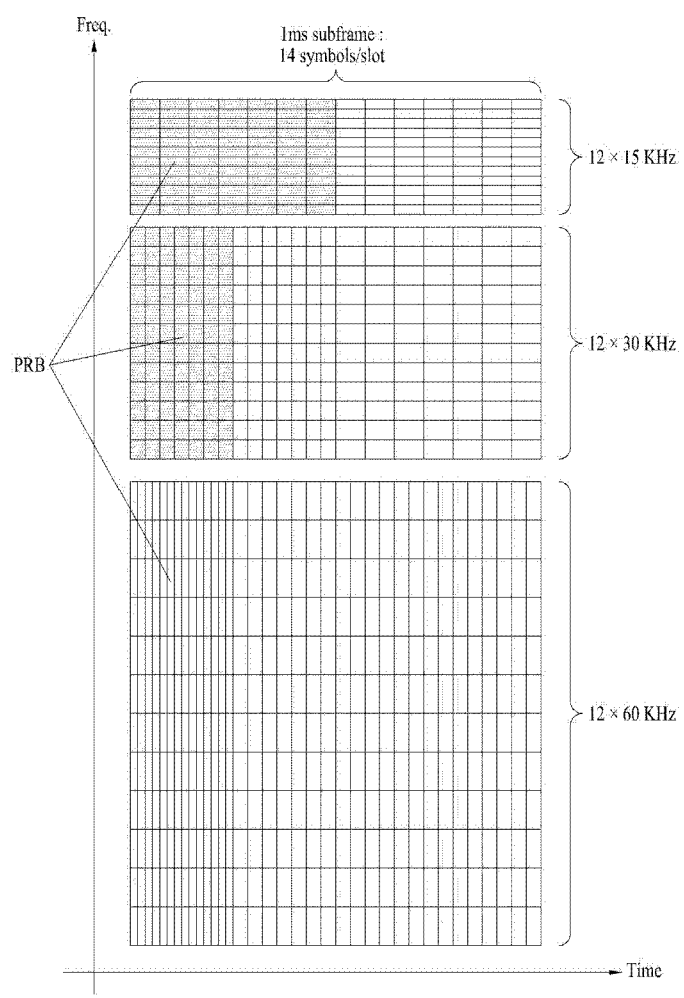

[FIG. 14]
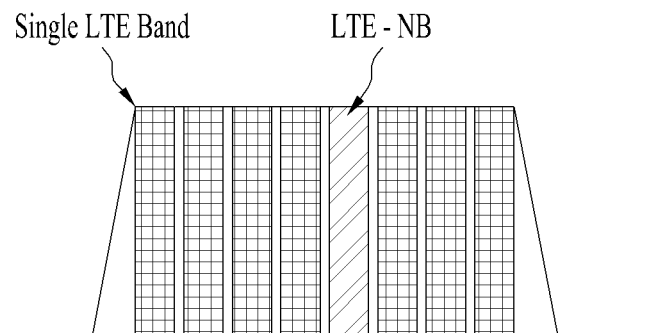
(a) In-band system
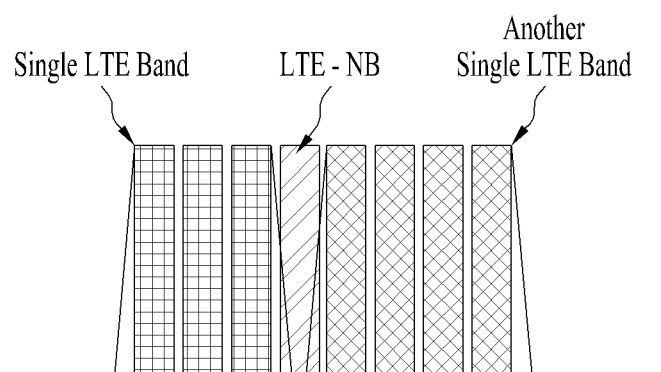
(b) Guard-band system
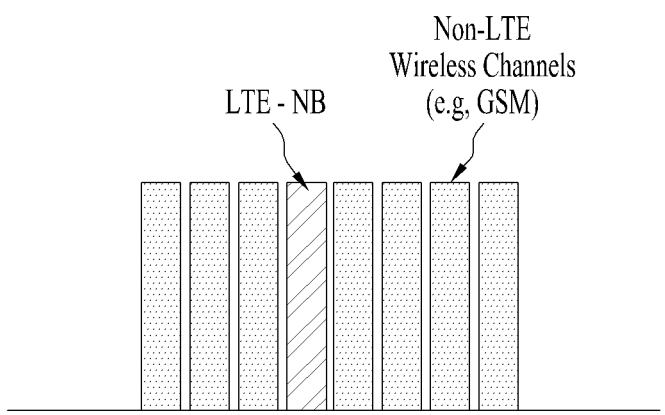
(c) Stand-alone system

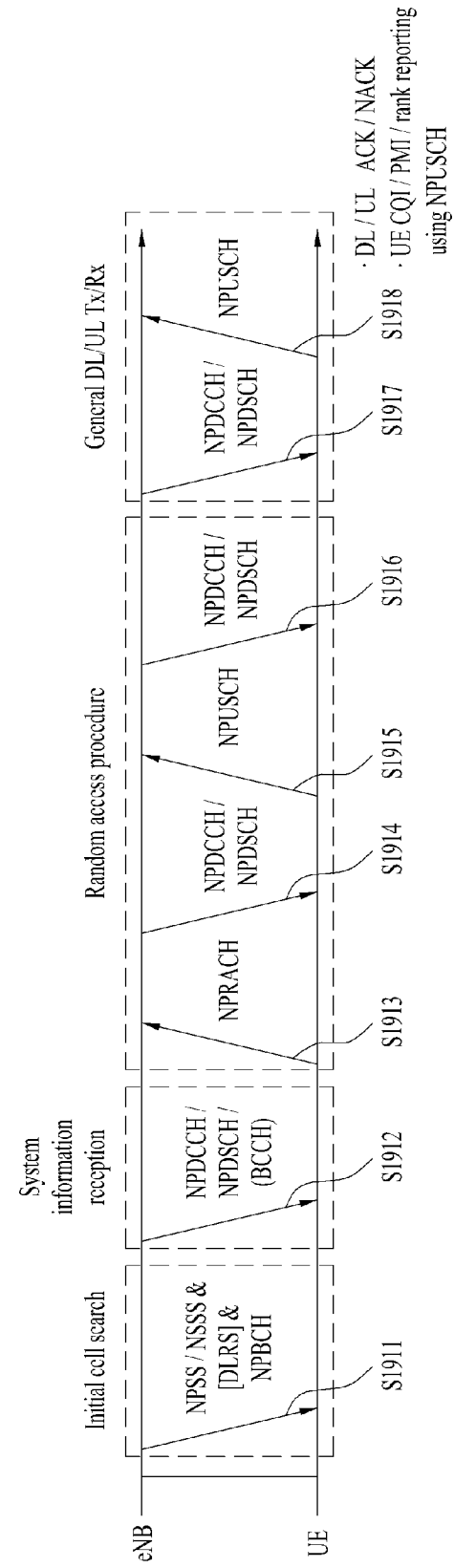
[FIG. 15]

[FIG. 16]
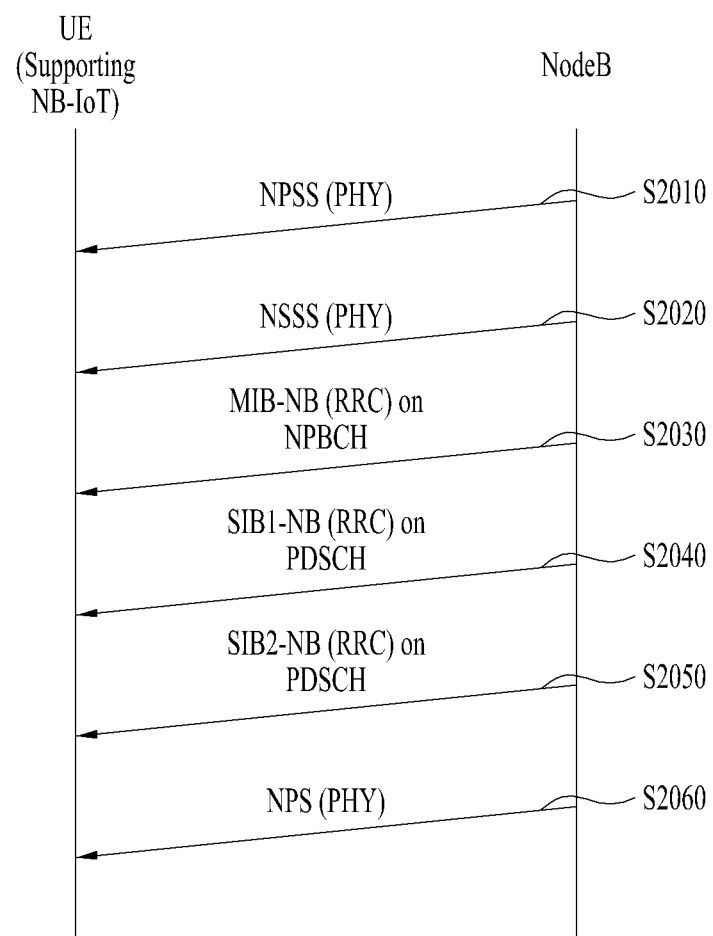

[FIG. 17]
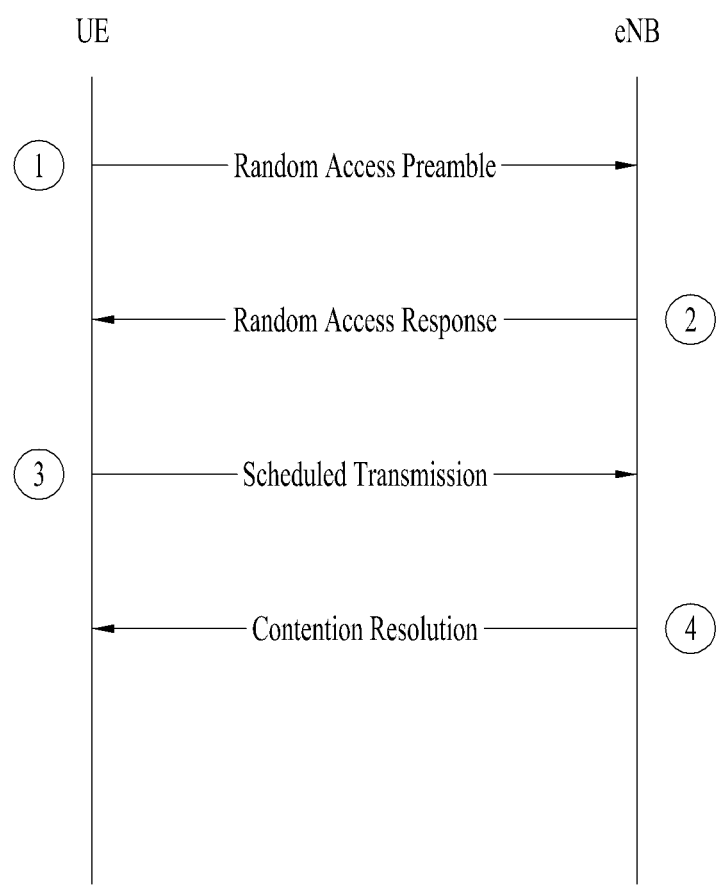

[FIG. 18]
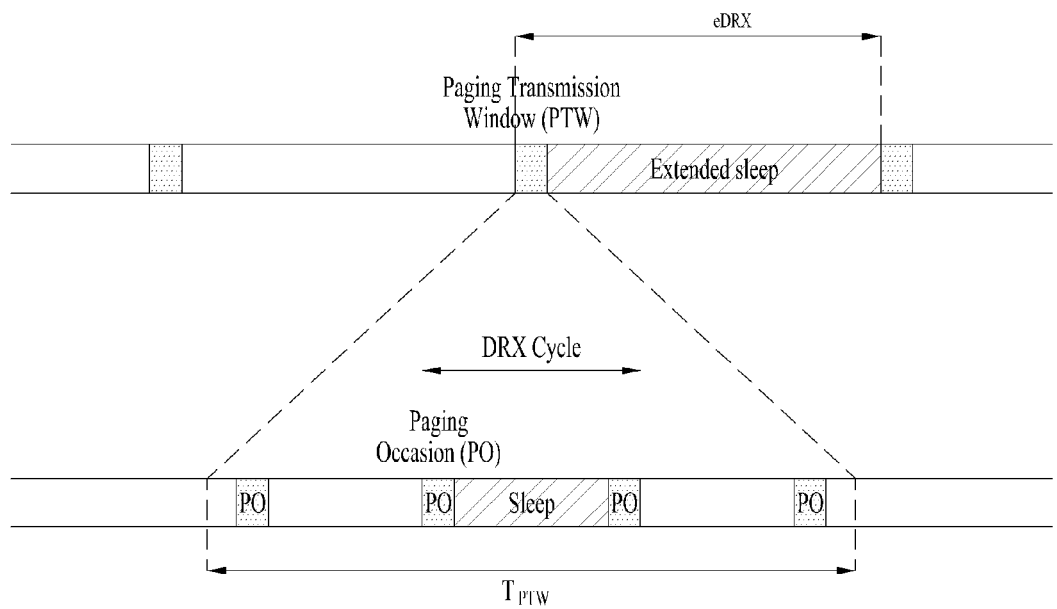

[FIG. 19]
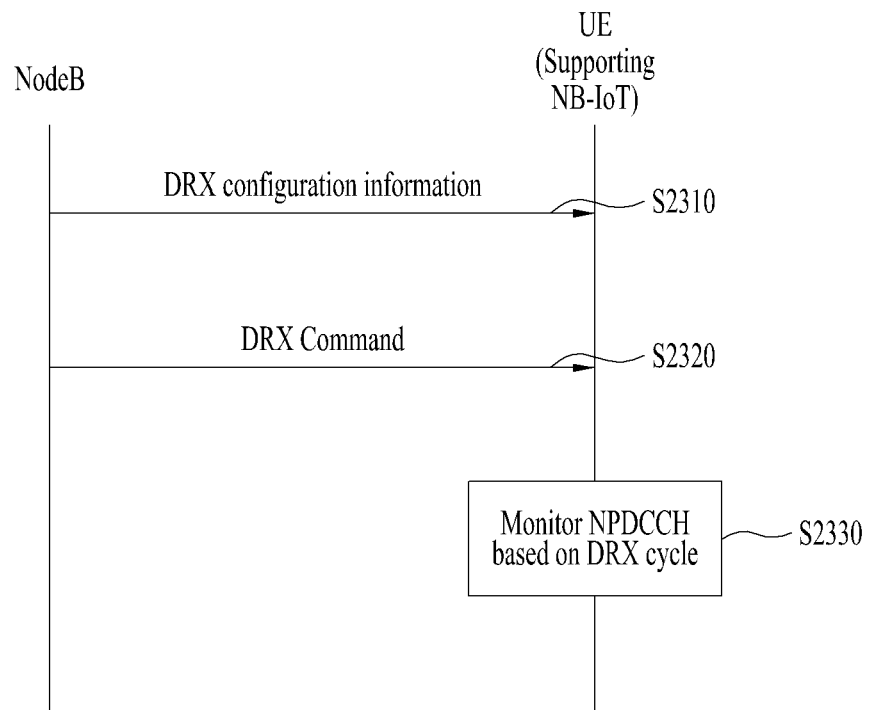
[FIG. 20]
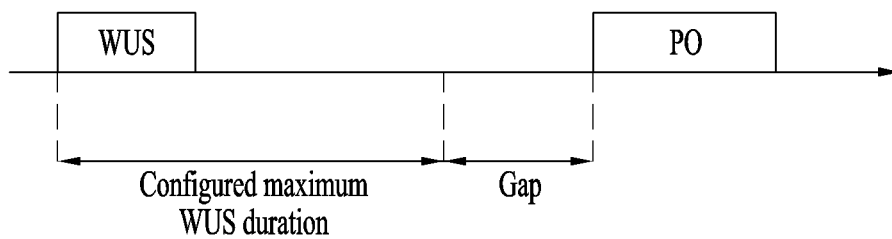

[FIG. 21]
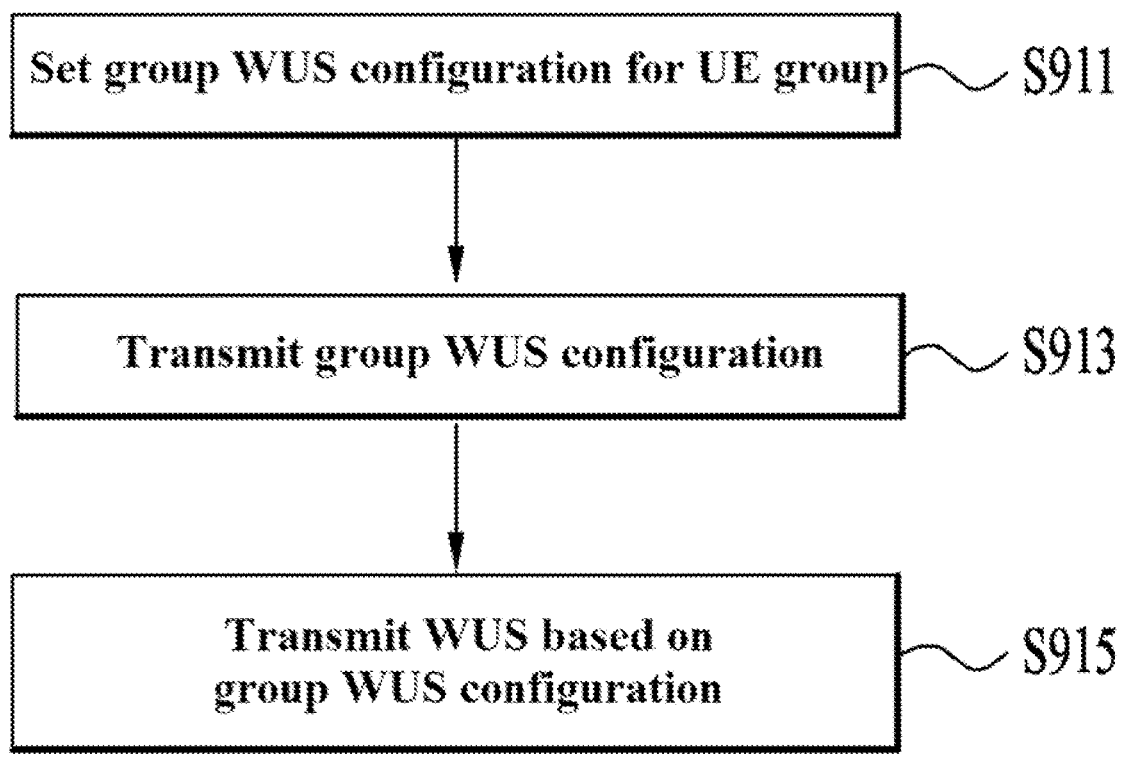

[FIG. 22]
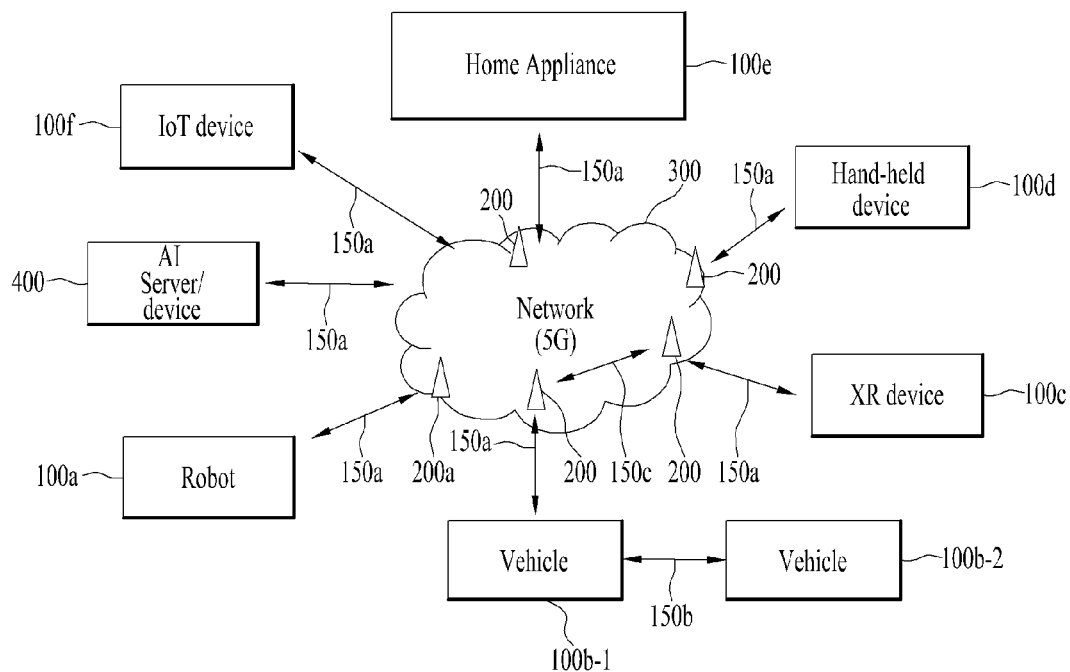
[FIG. 23]
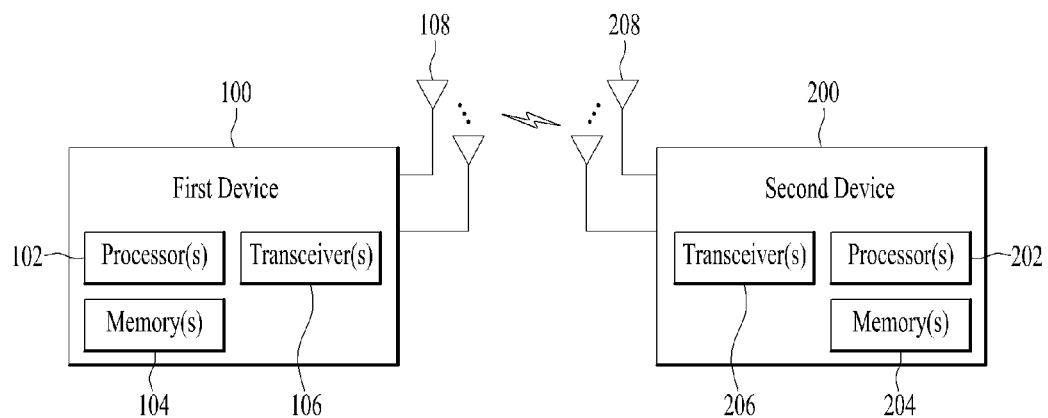

[FIG. 24]
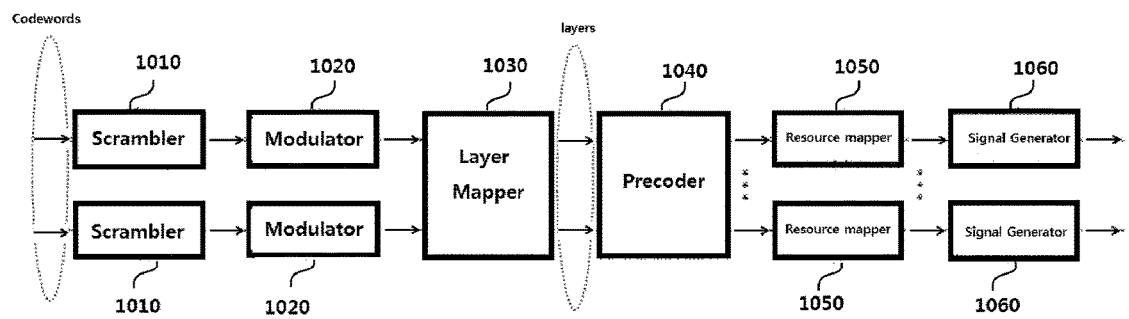

[FIG. 25]
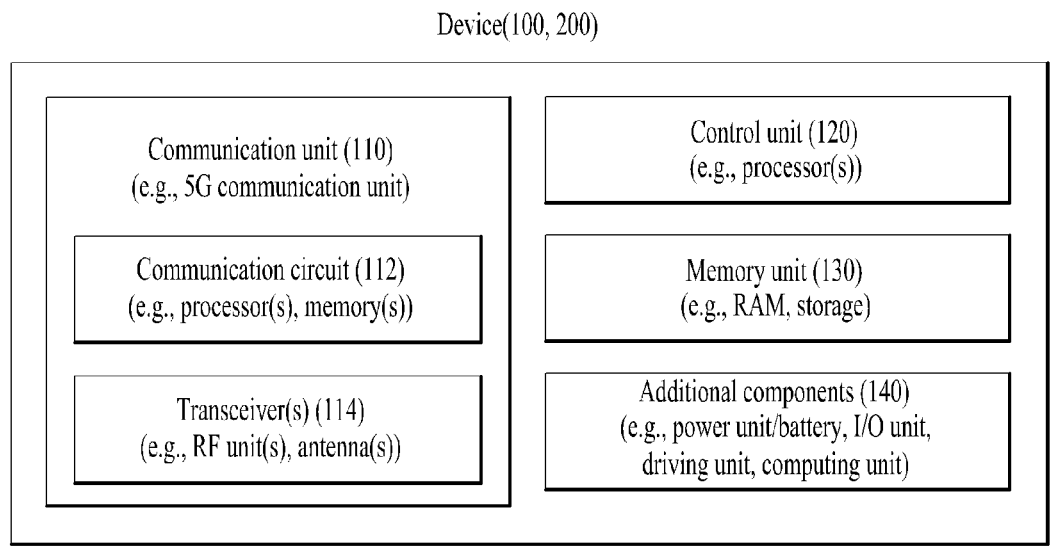
[FIG. 26]
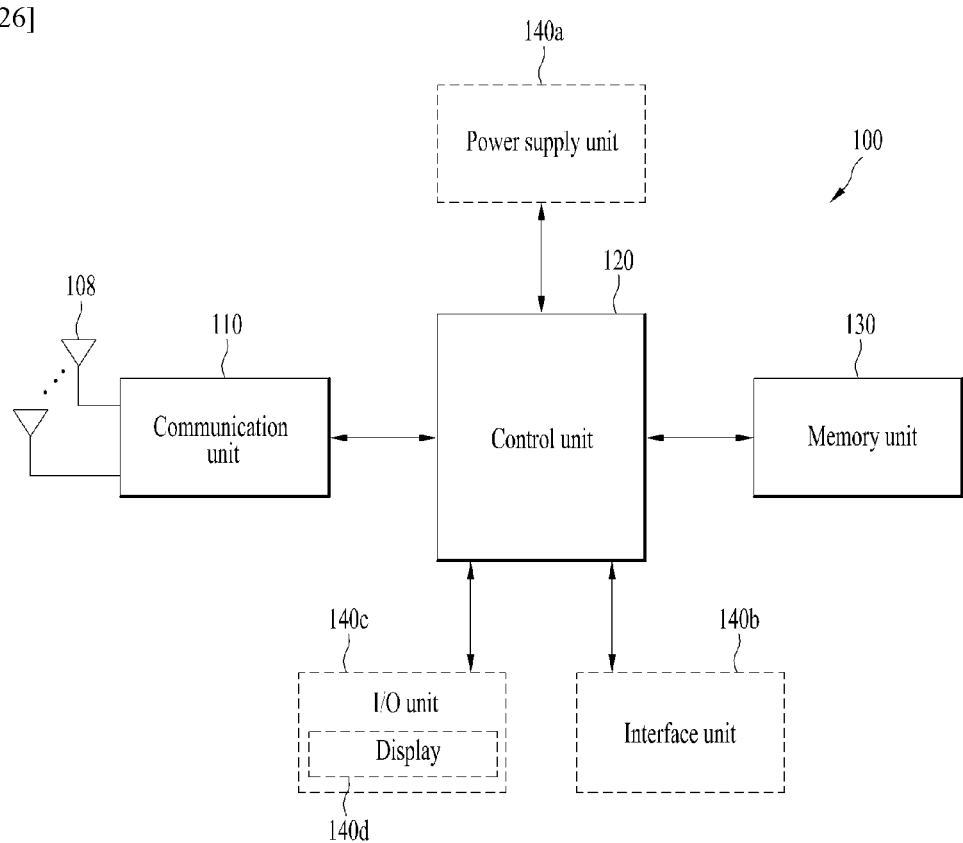

[FIG. 27]
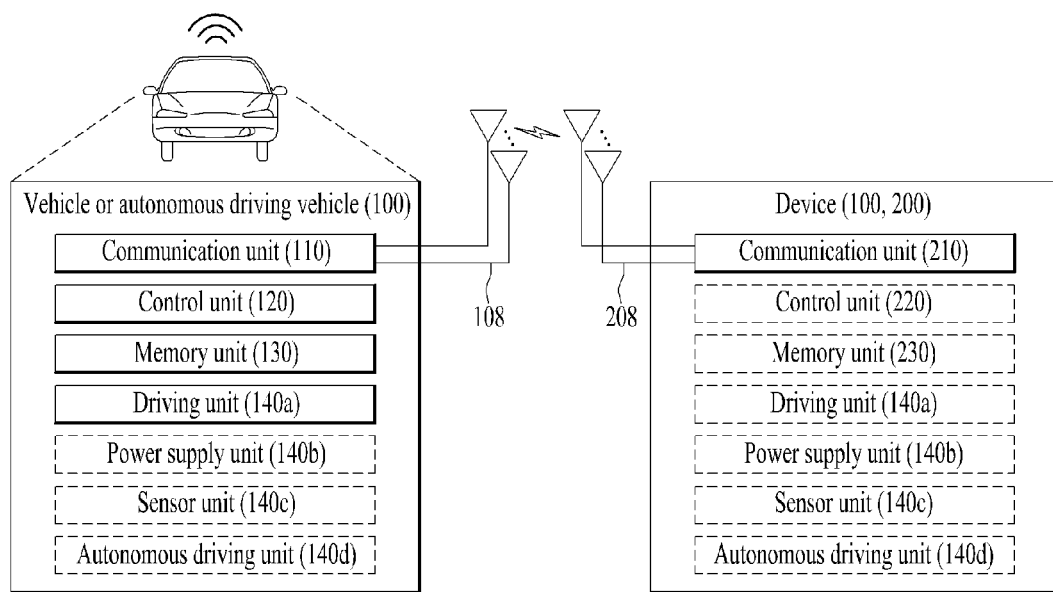

METHOD FOR TRANSMITTING WUS IN WIRELESS COMMUNICATION SYSTEM, AND DEVICE THEREFOR

CROSS-REFERENCE TO RELATED APPLICATIONS

This application is a continuation of U.S. patent application Ser. No. 17/266,878, filed on Feb. 8, 2021, which is the National Stage filing under 35 U.S.C. 371 of International Application No. PCT/KR2019/010170, filed on Aug. 9, 2019, which claims the benefit of earlier filing date and right of priority to KR Application Nos. 10-2018-0093431 filed on Aug. 9, 2018, 10-2018-0114511 filed on Sep. 22, 2018, and 10-2019-0051369 filed on May 2, 2019, the contents of which are all hereby incorporated by reference herein in their entirety.

TECHNICAL FIELD

The present disclosure relates to a wireless communication system and, more particularly, to a method of transmitting a wake-up signal (WUS) in a wireless communication system and an apparatus therefor.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DETAILED DESCRIPTION OF THE DISCLOSURE

Technical Problems

An object of the present disclosure is to provide a method of efficiently grouping WUSs or WUS resources according to each user equipment (UE) group in consideration of the gap capability of a UE or characteristics of extended discontinuous reception (eDRX), and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

According to an aspect of the present disclosure, provided herein is a method of transmitting a wake-up signal (WUS) by a communication apparatus in a wireless communication system, including setting a group WUS configuration related to a configuration of a WUS resource for each user equipment (UE) group, transmitting the set group WUS configuration, and transmitting the WUS based on the group WUS configuration, wherein the group WUS configuration is divided into a first WUS configuration for extended discontinuous reception (eDRX) and a second WUS configuration for discontinuous reception (DRX).

The first WUS configuration may include allocation information about the WUS resource distinguished from the second WUS configuration.

The first WUS configuration may include configuration information about the WUS resource distinguished in at least one of a time domain, a frequency domain, or a code domain from the WUS resource allocated by the second WUS configuration.

The first WUS configuration may include configuration information about a time gap distinguished from the time gap for the second WUS configuration, and the time gap may be a gap in a time domain from the WUS resource to a paging occasion (PO).

The first WUS configuration may be differently set according to a gap capability of a UE operating based on eDRX.

The gap capability of the UE may be determined based on a size of a gap from the WUS resource to a paging occasion (PO), supported by the UE.

The first WUS configuration may be signaled by a higher-layer signal having an independent field according to the gap capability of the UE.

The first WUS configuration may be set not to be applied to the UE having the gap capability of a size of 1 second (1 s) or 2 seconds (2 s).

The first WUS configuration may be set not to be applied to the UE having no gap capability of a size of 1 second (1 s) or 2 seconds (2 s).

The group WUS configuration may be differently set according to a size of a time gap between the WUS resource and a paging occasion (PO).

The group WUS configuration may be signaled by a higher-layer signal having an independent field according the size of the time gap between the WUS resource and the PO.

The WUS resource may include a resource in at least one of a time domain, a frequency domain, or a code domain.

In another aspect of the present disclosure, provided herein is an apparatus for transmitting a wake-up signal (WUS) in a wireless communication system, including a radio frequency (RF) transceiver, and a processor connected to the RF transceiver, wherein the processor sets a group WUS configuration related to a configuration of a WUS resource for each user equipment (UE) group, controls the RF transceiver to transmit the set group WUS configuration and the WUS based on the group WUS configuration, and wherein the group WUS configuration is divided into a first WUS configuration for extended discontinuous reception (eDRX) and a second WUS configuration for discontinuous reception (DRX).

The processor may receive input of a user to switch a traveling mode of a vehicle related to the apparatus from a self-driving mode to a manual driving mode or from the manual driving mode to the self-driving mode.

Advantageous Effects

According to various embodiments of the present disclosure, WUSs or WUS resources may be efficiently grouped according to each UE group in consideration of the gap capability of a UE or characteristics of eDRX.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

FIG. 1 illustrates physical channels used in 3rd generation partnership project (3GPP) long term evolution(-advanced) (LTE(-A)) and a signal transmission method using the same.

FIG. 2 illustrates a radio frame structure.

FIG. 3 illustrates a resource grid of a downlink slot.

FIG. 4 illustrates a downlink subframe structure.

FIG. 5 illustrates the structure of an uplink subframe used in LTE(-A).

FIG. 6 illustrates an exemplary structure of a self-contained subframe.

FIG. 7 illustrates frame structures defined in 3GPP NR.

FIG. 8 illustrates arrangement of an in-band anchor carrier in an LTE bandwidth of 10 MHz.

FIG. 9 illustrates positions at which NB-IoT downlink physical channels/signals are transmitted in an FDD LTE system.

FIG. 10 illustrates resource allocation for an NB-IoT signal and an LTE signal in an in-band mode.

FIG. 11 illustrates multi-carrier scheduling.

FIG. 12 illustrates an example of a resource grid in NR.

FIG. 13 illustrates an example of a physical resource block in NR.

FIG. 14 illustrates an example of operation modes supported in the NB-IoT system.

FIG. 15 illustrates an example of physical channels available in the NB-IoT and a general signal transmission method using the same.

FIG. 16 illustrates an example of an initial access procedure of NB-IoT.

FIG. 17 illustrates an example of a random access procedure of NB-IoT.

FIG. 18 illustrates an example of DRX mode in an idle state and/or an inactive state.

FIG. 19 illustrates an example of a DRX configuration and indication procedure for the NB-IoT UE.

FIG. 20 illustrates transmission of a wake-up signal (WUS).

FIG. 21 illustrates a configuration for a method of transmitting a WUS according to an embodiment.

FIG. 22 illustrates a communication system applied to the present disclosure.

FIG. 23 illustrates a wireless device applicable to the present disclosure.

FIG. 24 illustrates a signal process circuit for a transmission signal

FIG. 25 illustrates another example of a wireless device applied to the present disclosure.

FIG. 26 illustrates a hand-held device applied to the present disclosure.

FIG. 27 illustrates a vehicle or an autonomous driving vehicle applied to the present disclosure.

BEST MODE FOR CARRYING OUT THE DISCLOSURE

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink (DL) and SC-FDMA for uplink (UL). LTE-Advanced (LTE-A) evolves from 3GPP LTE. While the following description is given, centering on 3GPP LTE/LTE-A for clarity, this is purely exemplary and thus should not be construed as limiting the present disclosure.

In a wireless communication system, a user equipment (UE) receives information through DL from a base station (BS) and transmit information to the BS through UL. The information transmitted and received by the BS and the UE includes data and various control information and includes various physical channels according to type/usage of the information transmitted and received by the UE and the BS.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a DL channel status by receiving a DL reference signal (RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general DL/UL signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

FIG. 2 illustrates a radio frame structure. UL/DL data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(a) illustrates a type-1 radio frame structure. A DL subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since DL uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for UL or DL according to UL-DL configuration. A subframe is composed of 2 slots.

Table 1 shows subframe configurations in a radio frame according to UL-DL configurations.

TABLE 1

| Uplink-downlink config-uration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and UL transmission synchronization in a UE. The GP eliminates UL interference caused by multi-path delay of a DL signal between a UL and a DL. The radio frame structure is merely exemplary and the number of subframes included in the radio frame, the number of slots included in a subframe, and the number of symbols included in a slot can be vary.

FIG. 3 illustrates a resource grid of a DL slot.

Referring to FIG. 3, a DL slot includes a plurality of OFDM symbols in the time domain. While one DL slot may include 7 OFDM symbols and one resource block (RB) may include 12 subcarriers in the frequency domain in the figure, the present disclosure is not limited thereto. Each element on the resource grid is referred to as a resource element (RE). One RB includes 12×7 REs. The number NDL of RBs included in the DL slot depends on a DL transmit bandwidth. The structure of a UL slot may be same as that of the DL slot.

FIG. 4 illustrates a DL subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical DL shared chancel (PDSCH) is allocated. A basic resource unit of the data region is an RB. Examples of DL control channels used in LTE include a physical control format indicator channel (PCFICH), a physical DL control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/negative-acknowledgment (NACK) signal. Control information transmitted through the PDCCH is referred to as DL control information (DCI). The DCI includes UL or DL scheduling information or a UL transmit power control command for an arbitrary UE group.

Control information transmitted through the PDCCH is referred to as DL control information (DCI). Formats 0, 3, 3A and 4 for UL and formats 1, 1A, 1B, 1C, 1D, 2, 2A, 2B and 2C for DL are defined as DCI formats. Information field type, the number of information fields, the number of bits of each information field, etc. depend on DCI format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. An arbitrary DCI format may be used to transmit two or more types of control information. For example, DCI formats 0/1A is used to carry DCI format 0 or DCI format 1, which are discriminated from each other using a flag field.

A PDCCH may carry a transport format and a resource allocation of a DL shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other DL control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality DL channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Transmission mode (TM)
  Transmission mode 1: Transmission from a single BS antenna port
  Transmission mode 2: Transmit diversity
  Transmission mode 3: Open-loop spatial multiplexing
  Transmission mode 4: Closed-loop spatial multiplexing
  Transmission mode 5: Multi-user MIMO (Multiple Input Multiple Output)

Transmission mode 6: Closed-loop rank-1 precoding
Transmission mode 7: Single-antenna port (port 5) transmission
Transmission mode 8: Double layer transmission (ports 7 and 8) or single-antenna port (port 7 or 8) transmission
Transmission mode 9: Transmission through up to 8 layers (ports 7 to 14) or single-antenna port (port 7 or 8) transmission
DCI Format
Format 0: Resource grants for PUSCH transmission
Format 1: Resource assignments for single codeword PDSCH transmission (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments FIG. 5 is a diagram illustrating a UL subframe structure in LTE(-A).

Referring to FIG. 5, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the UL subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of a UL control signal, for example, DL channel quality report from each UE, reception ACK/NACK for a DL signal, UL scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit a UL channel state to an eNB and is periodically transmitted according to a subframe period/offset set by a higher layer (e.g., RRC layer) or aperiodically transmitted at the request of the eNB.

To minimize data transmission latency, a self-contained subframe is considered in the next-generation radio access technology (RAT). FIG. 6 illustrates an exemplary self-contained subframe structure. In FIG. 6, the hatched area represents a DL control region, and the black area represents a UL control region. The area having no marks may be used for either DL data transmission or UL data transmission. In this structure, DL transmission and UL transmission are sequentially performed in one subframe to transmit DL data and receive a UL ACK/NACK for the DL data in the subframe. As a result, the resulting reduction of a time taken to retransmit data when a data transmission error occurs may lead to minimization of the latency of a final data transmission.

At least the following four subframe types may be considered as exemplary constructible/configurable self-contained subframe types. Periods are enumerated in time order.
DL control period+DL data period+guard period (GP)+UL control period
DL control period+DL data period
DL control period+GP+UL data period+UL control period
DL control period+GP+UL data period A PDFICH, a PHICH, and a PDCCH may be transmitted in the DL control period, and a PDSCH may be transmitted in the DL data period. A PUCCH may be transmitted in the UL control period, and a PUSCH may be transmitted in the UL data period. The GP provides a time gap for switching from a transmission mode to a reception mode or from the reception mode to the transmission mode at an eNB and a UE. Some OFDM symbol(s) at a DL-to-UL switching time may be configured as the GP.

In the environment of the 3GPP NR system, different OFDM numerologies, for example, different subcarrier spacings (SCSs) and hence different OFDM symbol (OS) durations may be configured between a plurality of cells aggregated for one UE. Accordingly, the (absolute time) duration of a time resource (e.g., SF, slot or TTI) (referred to as a time unit (TU) for convenience) including the same number of symbols may be set differently for the aggregated cells. Herein, the term symbol may cover OFDM symbol and SC-FDMA symbol.

FIG. 7 illustrates frame structures defined in 3GPP NR. In 3GPP NR, one radio frame includes 10 subframes each being 1 ms in duration, like a radio frame in LTE/LTE-A (see FIG. 2). One subframe includes one or more slots and the length of a slot varies with an SCS. 3GPP NR supports SCSs of 15 KHz, 30 KHz, 60 KHz, 120 KHz, and 240 KHz. A slot corresponds to a TTI in FIG. 6.

As noted from Table 4, the number of symbols per slot, the number of slots per frame, and the number of slots per subframe vary according to SCSs.

TABLE 4

| SCS (15*2^u) | Number of symbols per slot | Number of slots per frame | Number of slots per subframe |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

A description will be given of narrowband Internet of things (NB-IoT). While NB-IoT is described based on the 3GPP LTE standards for convenience, the following description is also applicable to the 3GPP NR standards. For this purpose, some technical configurations may be replaced with other ones in interpretation (e.g., LTE band→NR band and subframe→slot). NB-IoT supports three operation modes: in-band mode, guard-band mode, and stand-alone mode. The same requirements apply to each mode.

(1) In-band mode: a part of the resources of the LTE band are allocated to NB-IoT.

(2) Guard-band mode: a guard frequency band of the LTE band is used, and an NB-IoT carrier is arranged as close as possible to an edge subcarrier of the LTE band.

(3) Stand-alone mode: some carriers in the GSM band are allocated to NB-IoT.

An NB-IoT UE searches for an anchor carrier in units of 100 kHz, for initial synchronization, and the center frequency of the anchor carrier should be located within ±7.5 kHz from a 100-kHz channel raster in the in-band and guard-band. Further, the center 6 physical resource blocks (PRBs) of the LTE PRBs are not allocated to NB-IoT. Therefore, the anchor carrier may be located only in a specific PRB.

FIG. 8 is a diagram illustrating arrangement of an in-band anchor carrier in an LTE bandwidth of 10 MHz.

Referring to FIG. 8, a direct current (DC) subcarrier is located on a channel raster. Since the center frequency spacing between adjacent PRBs is 180 kHz, the center frequencies of PRBs 4, 9, 14, 19, 30, 35, 40 and 45 are located at ±2.5 kHz from the channel raster. Similarly, when the bandwidth is 20 MHz, the center frequency of a PRB suitable as the anchor carrier is located at ±2.5 kHz from the channel raster, and when the bandwidth is 3 MHz, 5 MHz, or 15 MHz, the center frequency of a PRB suitable as the anchor carrier is located at ±7.5 kHz from the channel raster.

In the guard-band mode, given bandwidths of 10 MHz and 20 MHz, the center frequency of a PRB immediately adjacent to an edge PRB of the LTE system is located at ±2.5 kHz from the channel raster. Further, given bandwidths of 3 MHz, 5 MHz, and 15 MHz, a guard frequency band corresponding to three subcarriers from an edge PRB may be used, and thus the center frequency of the anchor carrier may be located at ±7.5 kHz from the channel raster.

In the stand-alone mode, an anchor carrier is aligned with the 100-kHz channel raster, and all GSM carriers including the DC carrier may be available as the NB-IoT anchor carrier.

Further, NB-IoT may support multiple carriers, and a combination of in-band and in-band, a combination of in-band and guard-band, a combination of guard-band and guard-band, and a combination of stand-alone and stand-alone are available.

NB-IoT DL uses OFDMA with a 15-kHz SCS. OFDMA provides orthogonality between subcarriers, so that the NB-IoT system and the LTE system may coexist smoothly.

For NB-IoT DL, physical channels such as a narrowband physical broadcast channel (NPBCH), a narrowband physical downlink shared channel (NPDSCH), and a narrowband physical downlink control channel (NPDCCH) may be provided, and physical signals such as a narrowband primary synchronization signal (NPSS), a narrowband primary synchronization signal (NSSS), and a narrowband reference signal (NRS) are provided.

The NPBCH delivers minimum system information required for an NB-IoT UE to access the system, a master information block-narrowband (MIB-NB) to the NB-IoT UE. The NPBCH signal may be transmitted repeatedly eight times in total for coverage enhancement. The transport block size (TBS) of the MIB-NB is 34 bits and updated every TTI of 640 ms. The MIB-NB includes information about an operation mode, a system frame number (SFN), a hyper-SFN, the number of cell-specific reference signal (CRS) ports, and a channel raster offset.

The NPSS includes a Zadoff-Chu (ZC) sequence of length 11 and root index 5. The NPSS may be generated by the following equation.

$$d_l(n) = S(l) \cdot e^{-j\frac{\pi u n(n+1)}{11}}, \quad [\text{Equation 1}]$$
$$n = 0, 1, \ldots, 10$$

S(l) for symbol index l may be defined as illustrated in Table 5.

TABLE 5

| Cyclic prefix length | | | | S(3), . . . , S(13) | | | | | | |
|---|---|---|---|---|---|---|---|---|---|---|
| Normal | 1 | 1 | 1 | 1 | −1 | −1 | 1 | 1 | 1 | −1 | 1 |

The NSSS includes a combination of a ZC sequence of length 131 and a binary scrambling sequence such as a Hadamard sequence. The NSSS indicates a PCID to NB-IoT UEs within the cell by the combination of sequences. The NSSS may be generated by the following equation.

$$d(n) = b_q(m) e^{-j2\pi\theta_f n} e^{-j\frac{\pi u n'(n'+1)}{131}} \quad [\text{Equation 2}]$$

Variables applied to Equation 2 may be defined as follows.

$$n = 0, 1, \ldots, 131 \quad [\text{Equation 3}]$$
$$n' = n \bmod 131$$
$$m = n \bmod 128$$
$$u = N_{ID}^{Ncell} \bmod 126 + 3$$
$$q = \left\lfloor \frac{N_{ID}^{Ncell}}{126} \right\rfloor$$

A binary sequence $b_q(m)$ may be defined as illustrated in Table 6, and $b_0(m)$ to $b_3(m)$ represent columns 1, 32, 64, and 128 of a Hadamard matrix of order 128. A cyclic shift $\theta_f$ for a frame number of may be defined by Equation 4 below.

TABLE 6

| q | $b_q(0), \ldots b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 −1 −1 1 −1 1 1 1 −1 −1 1 1 −1 1 −1 −1 1 1 −1 1 1 −1 −1 1 1 −1 1 1 −1 1 1 −1 1 −1 −1 1 −1 1 1 −1 −1 1 −1 1 −1 1 −1 1 −1 −1 1 −1 1 −1 1 −1 1 −1 1 −1 1 −1 1 −1 1 −1 1 −1 1 −1 1 −1 1 −1 1 −1 1 −1 1 −1 1 −1 1 −1 1 −1 1 −1 1 1 −1 1 1 1 −1] |
| 2 | [1 −1 −1 1 −1 1 1 1 −1 −1 1 1 −1 1 −1 −1 1 1 −1 1 1 −1 −1 1 1 −1 1 1 −1 1 1 −1 1 −1 −1 1 −1 1 1 −1 −1 1 −1 1 −1 1 −1 1 −1 −1 1 −1 1 −1 1 −1 1 −1 1 −1 1 −1 1 −1 1 −1 1 −1 1 −1 1 −1 1 −1 1 −1 1 −1 1 −1 1 −1 1 −1 1 −1 1 −1 1 1 −1 1 1 1 −1 |

TABLE 6-continued

| q | $b_q(0), \ldots b_q(127)$ |
|---|---|
|  | 1 −1 −1 1 1 −1 −1 1 −1 1 1 −1 1 −1 −1 1 −1 1 1 −1<br>−1 1 1 −1 1 −1 −1 1] |
| 3 | [1 −1 −1 1 −1 1 1 −1 −1 1 1 −1 1 −1 −1 1 −1 1 1 −1<br>1 −1 −1 1 1 −1 −1 1 −1 1 1 −1 −1 1 1 −1 1 −1 −1 1<br>1 −1 −1 1 −1 1 1 −1 1 −1 −1 1 −1 1 1 −1 1 −1 −1 1<br>1 −1 −1 1 −1 1 1 −1 1 −1 −1 1 −1 1 1 −1 1 −1 −1 1<br>1 −1 −1 1 −1 1 1 −1 −1 1 1 −1 1 −1 −1 1 1 1 −1 −1 1<br>−1 1 1 −1 −1 1 1 −1 −1 1 1 −1 −1 1 1 −1 1 −1 −1 1<br>1 −1 −1 1 −1 1 1 −1] |

$$\theta_f = \frac{33}{132}(n_f/2) \bmod 4 \qquad \text{[Equation 4]}$$

In Equation 4, of represents a radio frame number and mod represents a modulo function.

The NRS, which is a reference signal for channel estimation required for demodulation of a DL physical channel, is generated in the same manner as in LTE. However, the NRS uses a narrowband-physical cell ID (NB-PCID) (or NCell ID or NB-IoT BS ID) as an initial value for initialization. The NRS is transmitted through one or two antenna ports (p=2000 and 2001).

The NPDCCH has the same transmission antenna configuration as the NPBCH, and delivers DCI. The NPDCCH supports three types of DCI formats. DCI format N0 includes scheduling information about a narrowband physical uplink shared channel (NPUSCH), and DCI formats N1 and N2 include NPDSCH scheduling information. The NPDCCH may be transmitted repeatedly up to 2048 times, for coverage enhancement.

The NPDSCH is used to transmit data (e.g., a TB) of a transport channel such as a DL-SCH or a paging channel (PCH). The NPDSCH has a maximum TBS of 680 bits and may be transmitted repeatedly up to 2048 times, for coverage enhancement.

FIG. 9 is a diagram illustrating positions at which NB-IoT DL physical channels/signals are transmitted in an FDD LTE system.

Referring to FIG. 9, the NPBCH is transmitted in the first subframe of each radio frame, the NPSS is transmitted in the sixth subframe of each radio frame, and the NSSS is transmitted in the last subframe (e.g., tenth subframe) of each even-numbered frame. An NB-IoT UE acquires frequency synchronization, symbol synchronization, and frame synchronization and searches 504 PCIDs (i.e., BS IDs) by synchronization signals (the NPSS and the NSSS). The LTE synchronization signals are transmitted in 6 PRBs, whereas the NB-IoT synchronization signals are transmitted in one PRB.

In NB-IoT, UL physical channels include a narrowband physical random access channel (NPRACH) and an NPUSCH, and support single-tone transmission and multi-tone transmission. Multi-tone transmission is supported only for an SCS of 15 kHz, and single-tone transmission is supported for SCSs of 3.5 kHz and 15 kHz. On UL, when the SCS is 15 kHz, orthogonality with the LTE system is maintained, thereby providing optimum performance. However, the 3.75-kHz SCS may destroy the orthogonality, resulting in performance degradation due to interference.

An NPRACH preamble includes four symbol groups, each including a CP and five (SC-FDMA) symbols. The NPRACH supports only single-tone transmission with the 3.75-kHz SCS and provides CPs of 66.7 μs and 266.67 μs in length to support different cell radiuses. Each symbol group is subjected to frequency hopping in the following hopping pattern. Subcarriers carrying the first symbol group are determined pseudo-randomly. The second symbol group hops by one subcarrier, the third symbol group hops by six subcarriers, and the fourth symbol group hops by one subcarrier. In the case of repeated transmissions, the frequency hopping procedure is repeatedly applied. To enhance coverage, the NPRACH preamble may be repeatedly transmitted up to 128 times.

The NPUSCH supports two formats. NPUSCH format 1 is used for UL-SCH transmission and has a maximum TBS of 1000 bits. NPUSCH format 2 is used for UCI transmission such as HARQ-ACK signaling. NPUSCH format 1 supports single-tone transmission and multi-tone transmission, whereas NPUSCH format 2 supports only single-tone transmission. In single-tone transmission, p/2-binary phase shift keying (BPSK) and p/4-quadrature phase shift keying (QPSK) may be used to reduce a peak-to-average power ratio (PAPR).

In the stand-alone and guard-band modes, all resources of one PRB may be allocated to NB-IoT. However, there is a constraint on resource mapping in the in-band mode, for co-existence with a legacy LTE signal. For example, resources (OFDM symbols 0 to 2 in each subframe) classified as a region allocated for LTE control channels may not be allocated to the NPSS and NSSS, and NPSS and NSSS symbols mapped to LTE CRS REs are punctured.

FIG. 10 is a diagram illustrating resource allocation to an NB-IoT signal and an LTE signal in the in-band mode. Referring to FIG. 10, for ease of implementation, the NPSS and NSSS are not transmitted in OFDM symbols corresponding to the control region of the legacy LTE system (the first three OFDM symbols of a subframe) regardless of an operation mode. NPSS/NSS REs colliding with LTE CRS REs in physical resources are punctured, for mapping without affecting the legacy LTE system.

After the cell search, the NB-IoT UE demodulates the NPBCH without system information except for a PCID. Therefore, NPBCH symbols may not be mapped to the LTE control channel allocation region. Moreover, since the NB-IoT UE assumes four LTE antenna ports (e.g., p=0, 1, 2, and 3) and two NB-IoT antenna ports (e.g., p=2000 and 2001) in the situation without system information, the NB-IoT UE may not allocate the NPBCH to CRS REs and NRS REs. Therefore, the NPBCH is rate-matched according to available resources.

After demodulating the NPBCH, the NB-IoT UE may acquire information about the number of CRS antenna ports. However, the NB-IoT UE still may not acquire information about the LTE control channel allocation region. Therefore, the NPDSCH carrying system information block type 1 (SIB1) data is not mapped to resources classified as the LTE control channel allocation region.

However, unlike the NPBCH, REs which are not allocated to the LTE CRS may be allocated to the NPDSCH. Since the NB-IoT UE has acquired all information related to resource mapping after receiving SIB1, an eNB may map the NPDSCH (except for the case where SIB1 is transmitted) and the NPDCCH to available resources based on LTE control channel information and the number of CRS antenna ports.

FIG. 11 is a diagram illustrating an exemplary operation when multiple carriers are configured in FDD NB-IoT. In FDD NB-IoT, a DL/UL anchor carrier is basically configured, and a DL (and UL) non-anchor carrier may be additionally configured. RRCConnectionReconfiguration may include information about the non-anchor carrier. When the DL non-anchor carrier is configured, a UE receives data only in the DL non-anchor carrier. In contrast, synchronization signals (NPSS and NSSS), a broadcast signal (MIB and SIB), and a paging signal are provided only in the anchor carrier. When the DL non-anchor carrier is configured, the UE listens to only the DL non-anchor carrier while the UE is in an RRC_CONNECTED state. Similarly, when the UL non-anchor carrier is configured, the UE transmits data only in the UL non-anchor carrier, not being allowed to transmit data simultaneously in the UL non-anchor carrier and the UL anchor carrier. When the UE transitions to an RRC_IDLE state, the UE returns to the anchor carrier.

In the illustrated case of FIG. 11, UE1 is configured only with anchor carriers, UE2 is configured additionally with a DL/UL non-anchor carrier, and UE3 is configured additionally with a DL non-anchor carrier. Accordingly, each UE transmits and receives data in the following carriers.

UE1: data reception (DL anchor carrier) and data transmission (UL anchor carrier)
UE2: data reception (DL non-anchor carrier) and data transmission (UL non-anchor carrier)
UE3: data reception (DL non-anchor carrier) and data transmission (UL anchor carrier)

The NB-IoT UE is not capable of simultaneous transmission and reception, and a transmission/reception operation is limited to one band. Therefore, even though multiple carriers are configured, the UE requires only one transmission/reception chain in a 180-kHz band.

Table 7 lists system information defined in NB-IoT. A system information acquisition/changing process is performed only in the RRC_IDLE state. The UE does not expect to receive an SIB in the RRC_CONNECTED state. When system information has been changed, the system information change may be indicated to the UE by paging or a direct indication. For the purpose of providing the changed system information, the eNB may transition the UE to the RRC_IDLE state.

TABLE 7

| System Information Block | Content |
|---|---|
| MIB-NB | Essential information required to receive further system information |
| SIB1-NB | Cell access and selection, other SIB scheduling |
| SIB2-NB | Radio resource configuration information |
| SIB3-NB | Cell re-selection information for intra-frequency, interfrequency |
| SIB4-NB | Neighboring cell related information relevant for intrafrequency cell re-selection |
| SIB5-NB | Neighboring cell related information relevant for interfrequency cell re-selection |
| SIB14-NB | Access Barring parameters |
| SIB16-NB | Information related to GPS time and Coordinated Universal Time (UTC) |

The MIB-NB is transmitted on the NPBCH and updated every 640 ms. The first transmission of the MIB-NB takes place in subframe #0 of a radio frame satisfying SFN mod 0, and the MIB-NB is transmitted in subframe #0 of every radio frame. The MIB-NB is transmitted in 8 independently decodable blocks, each block being transmitted repeatedly 8 times. Table 8 describes the configuration of fields of the MIB-NB.

TABLE 8

```
MasterInformationBlock-NB ::=        SEQUENCE {
    systemFrameNumber-MSB-r13        BIT STRING (SIZE (4)),
    hyperSFN-LSB-r13                 BIT STRING (SIZE (2)),
    schedulingInfoSIB1-r13           INTEGER (0..15),
    systemInfoValueTag-r13           INTEGER (0..31),
    ab-Enabled-r13                   BOOLEAN,
    operationModeInfo-r13            CHOICE {
        inband-SamePCI-r13               Inband-SamePCI-NB-r13,
        inband-DifferentPCI-r13          Inband-DifferentPCI-NB-r13,
        guardband-r13                    Guardband-NB-r13,
        standalone-r13                   Standalone-NB-r13
    },
    spare                            BIT STRING (SIZE (11))
}
ChannelRasterOffset-NB-r13 ::= ENUMERATED {khz-7dot5, khz-2dot5,
khz2dot5, khz7dot5}
Guardband-NB-r13 ::=                 SEQUENCE {
    rasterOffset-r13                 ChannelRasterOffset-NB-r13,
    spare                            BIT STRING (SIZE (3))
}
Inband-SamePCI-NB-r13 ::=            SEQUENCE {
    eutra-CRS-SequenceInfo-r13       INTEGER (0..31)
}
Inband-DifferentPCI-NB-r13 ::=       SEQUENCE {
    eutra-NumCRS-Ports-r13           ENUMERATED {same, four},
    rasterOffset-r13                 ChannelRasterOffset-NB-r13,
    spare                            BIT STRING (SIZE (2))
}
Standalone-NB-r13 ::=                SEQUENCE {
    spare                            BIT STRING (SIZE (5))
}
```

The SIB1-NB is transmitted on the NPDSCH, with a periodicity of 2560 ms. The SIB1-NB is transmitted in subframe #4 of each of the even-numbered radio frames (i.e., 8 radio frames) of 16 consecutive radio frames. The indexes of the first radio frames carrying the SIB1-NB are derived according to an NPDSCH repetition number, Nrep and PCIDs. Specifically, when Nrep is 16 and the PCIDs are 2n and 2n+1, the indexes of the first radio frames are {0, 1}, and when Nrep is 8 and the PCIDs are 2n and 2n+1, the indexes of the first radio frames corresponding to the PCID of even numbers and the PCID of odd numbers are {0, 16}. Further, when Nrep is 4 and the PCIDs are 4n, 4n+1, 4n+2, and 4n+3, the indexes of the first radio frames are {0, 16, 32, 48}. The SIB1-NB is transmitted repeatedly Nrep times during 2560 ms, equally distributed across 2560 nm. The TBS and Nrep of the SIB1-NP are indicated by SystemInformationBlockType1-NB in the MIB-NB.

Table 9 lists NPDSCH repetition numbers according to SystemInformationBlockType1-NB.

TABLE 9

| Value of schedulingInfoSIB1 | Number of NPDSCH repetitions |
|---|---|
| 0 | 4 |
| 1 | 8 |
| 2 | 16 |
| 3 | 4 |
| 4 | 8 |
| 5 | 16 |
| 6 | 4 |
| 7 | 8 |
| 8 | 16 |
| 9 | 4 |
| 10 | 8 |
| 11 | 16 |
| 12-15 | Reserved |

An SI message (i.e., information subsequent to the SIB2-NB) is transmitted within a time-domain window that occurs periodically. Scheduling information for the SI message is provided by the SIB1-NB. Each SI message is associated with one SI-window, and SI-windows of different SI messages do not overlap with each other. That is, only corresponding SI is transmitted within one SI-window. The lengths of the SI-windows are equal and configurable.

FIG. 12 illustrates an example of a resource grid in NR.

Referring to the resource grid of FIG. 12, there are $N_{RB}^{\mu} N_{sc}^{RB}$ subcarriers in the frequency domain, and there are 14μ OFDM symbols in one subframe. However, the resource grid is merely exemplary and the present disclosure is not limited thereto. In the NR system, a transmitted signal is described by one or more resource grids, each including $N_{RB}^{\mu} N_{sc}^{RB}$ subcarriers, and $2^{\mu} N_{symb}^{(\mu)}$ OFDM symbols. In this case, $N_{RB}^{\mu} \leq N_{RB}^{max,\mu}$, $N_{RB}^{max,\mu}$ denotes the maximum transmission bandwidth and may change not only between numerologies but also between uplink and downlink. As shown in FIG. 12, one resource grid may be configured for each numerology μ and antenna port p. Each element of the resource grid for the numerology μ and antenna port p is referred to as a resource element, and it is uniquely identified by an index pair (k,l̄), where k is an index in the frequency domain (k=0, . . . , $N_{RB}^{\mu} N_{sc}^{RB}-1$) and l̄ denotes the location of a symbol in the subframe (l̄=0, . . . , $2\mu N_{symb}^{(\mu)}-1$). The resource element (k,l̄) for the numerology μ and antenna port p corresponds to a complex value $a_{k,l}^{(p,\mu)}$. When there is no risk of confusion or when a specific antenna port or numerology is not specified, the indexes p and μ may be dropped, and as a result, the complex value may be $a_{k,l}^{(p)}$ or $a_{k,l}$. In addition, a resource block (RB) is defined as $N_{sc}^{RB}=12$ consecutive subcarriers in the frequency domain.

Point A serves as a common reference point for resource block grids and may be obtained as follows.

OffsetToPointA for primary cell (PCell) downlink represents a frequency offset between point A and the lowest subcarrier of the lowest resource block in an SS/PBCH block used by the UE for initial cell selection. OffsetToPointA is expressed in the unit of resource block on the assumption of 15 kHz SCS for frequency range 1 (FR1) and 60 kHz SCS for frequency range 2 (FR2).

AbsoluteFrequencyPointA represents the frequency location of point A expressed as in absolute radio-frequency channel number (ARFCN).

Common resource blocks are numbered from 0 upwards in the frequency domain for SCS configuration μ.

The center of subcarrier 0 of common resource block 0 for the SCS configuration μ is equivalent to point A.

The relation between a common RB number $n_{CRB}^{\mu}$ in the frequency domain and a resource element (k,l) for the SCS configuration μ is determined as shown in Equation 5.

$$n_{CRB}^{\mu} = \left\lfloor \frac{k}{N_{sc}^{RB}} \right\rfloor \quad \text{[Equation 5]}$$

In Equation 5, k is defined relative to point A such that k=0 corresponds to a subcarrier centered on point A.

Physical resource blocks are defined within a bandwidth part (BWP) and numbered from 0 to $N_{BWP,i}^{size}-1$, where i denotes the number of the BWP.

The relationship between a physical resource block $n_{PRB}$ and a common resource block $n_{CRB}$ in BWP i is given by Equation 6.

$$n_{CRB} = n_{PRB} + N_{BWP,i}^{start} \quad \text{[Equation 6]}$$

$N_{BWP,i}^{start}$ is a common resource block where the BWP starts relative to common resource block 0.

FIG. 13 illustrates an example of a physical resource block in NR. Here, the time resource unit may be a subframe or a slot unit, and at least one symbol may be one time resource unit. Hereinafter, even if expressed as a subframe, the subframe may define a configuration corresponding to a time resource unit including several symbols.

FIG. 14 illustrates an example of operation modes supported in the NB-IoT system.

The NB-IoT system may support three operation modes. FIG. 14 illustrates an examples of operation modes supported in the NB-IoT system. Although the present disclosure describes the NB-IoT operation mode based on the LTE band, this is merely for convenience of description and the present disclosure is also applicable to other system bands (e.g., NR system band).

FIG. 14(a) illustrates an in-band system, FIG. 14(b) illustrates a guard-band system, and FIG. 14(c) illustrates a stand-alone system. The in-band system, guard-band system, and stand-alone system may be referred to as in-band mode, guard-band mode, and stand-alone mode, respectively.

The in-band system may mean a system or mode that uses one specific RB (PRB) in the legacy LTE band for the NB-IoT. To operate the in-band system, some RBs of the LTE system carrier may be allocated.

The guard-band system may mean a system or mode that uses a space reserved for the guard band of the legacy LTE band for the NB-IoT. To operate the guard-band system, the guard band of the LTE carrier which is not used as the RB in the LTE system may be allocated. For example, the legacy LTE band may be configured such that each LTE band has the guard band of minimum 100 kHz at the end thereof. In order to use 200 kHz, two non-contiguous guard bands may be used.

The in-band system and the guard-band system may operate in a structure where the NB-IoT coexists in the legacy LTE band.

Meanwhile, the stand-alone system may mean a system or mode independent from the legacy LTE band. To operate the stand-alone system, a frequency band (e.g., reallocated GSM carrier) used in a GSM EDGE radio access network (GERAN) may be separately allocated.

The above three operation modes may be applied independently, or two or more operation modes may be combined and applied.

General Signal Transmission and Reception Procedure in NB-IoT

FIG. 15 illustrates an example of physical channels available in the NB-IoT and a general signal transmission method using the same.

In a wireless communication system, an NB-IoT UE may receive information from a BS in downlink (DL) and transmit information to the BS in uplink (UL). In other words, the BS may transmit the information to the NB-IoT UE in downlink and receive the information from the NB-IoT UE in uplink in the wireless communication system.

Information transmitted and received between the BS and the NB-IoT UE may include various data and control information, and various physical channels may be used depending on the type/usage of information transmitted and received therebetween. The NB-IoT signal transmission and reception method described with reference to FIG. 20 may be performed by the aforementioned wireless communication apparatuses (e.g., BS and UE).

When the NB-IoT UE is powered on or enters a new cell, the NB-IoT UE may perform initial cell search (S11). The initial cell search involves acquisition of synchronization with the BS. Specifically, the NB-IoT UE may synchronize with the BS by receiving an NPSS and an NSSS from the BS and obtain information such as a cell ID. Thereafter, the NB-IoT UE may acquire information broadcast in the cell by receiving an NPBCH from the BS. During the initial cell search, the NB-IoT UE may monitor the state of a downlink channel by receiving a downlink reference signal (DL RS).

In other words, when the NB-IoT UE enters the new cell, the BS may perform the initial cell search, and more particularly, the BS may synchronize with the UE. Specifically, the BS may synchronize with the NB-IoT UE by transmitting the NPSS and NSSS to the UE and transmit the information such as the cell ID. The BS may transmit the broadcast information in the cell by transmitting (or broadcasting) the NPBCH to the NB-IoT UE. The BS may transmit the DL RS to the NB-IoT UE during the initial cell search to check the downlink channel state.

After completing the initial cell search, the NB-IoT UE may acquire more detailed system information by receiving a NPDCCH and a NPDSCH related to thereto (S12). In other words, after the initial cell search, the BS may transmit the more detailed system information by transmitting the NPDCCH and the NPDSCH related to thereto to the NB-IoT UE.

Thereafter, the NB-IoT UE may perform a random access procedure to complete the access to the BS (S13 to S16).

Specifically, the NB-IoT UE may transmit a preamble on an NPRACH (S13). As described above, the NPRACH may be repeatedly transmitted based on frequency hopping for coverage enhancement. In other words, the BS may (repeatedly) receive the preamble from the NB-IoT UE over the NPRACH.

Then, the NB-IoT UE may receive a random access response (RAR) for the preamble from the BS on the NPDCCH and the NPDSCH related thereto (S14). That is, the BS may transmit the random access response (RAR) for the preamble to the BS on the NPDCCH and the NPDSCH related thereto.

The NB-IoT UE may transmit an NPUSCH using scheduling information in the RAR (S15) and perform a contention resolution procedure based on the NPDCCH and the NPDSCH related thereto (S16). That is, the BS may receive the NPUSCH from the NB-IoT UE based on the scheduling information in the RAR and perform the contention resolution procedure.

After performing the above-described processes, the NB-IoT UE may perform NPDCCH/NPDSCH reception (S17) and NPUSCH transmission (S18) as a normal UL/DL signal transmission procedure. After the above-described processes, the BS may transmit the NPDCCH/NPDSCH to the NB-IoT UE and receive the NPUSCH from the NB-IoT UE during the normal uplink/downlink signal transmission procedure.

In the NB-IoT, the NPBCH, NPDCCH, NPDSCH, etc. may be repeatedly transmitted for the coverage enhancement as described above. In addition, UL-SCH (normal uplink data) and UCI may be transmitted on the NPUSCH. In this case, the UL-SCH and UCI may be configured to be transmitted in different NPUSCH formats (e.g., NPUSCH format 1, NPUSCH format 2, etc.)

As described above, the UCI means control information transmitted from the UE to the BS. The UCI may include the HARQ ACK/NACK, scheduling request (SR), CSI, etc. The CSI may include the CQI, PMI, RI, etc. Generally, the UCI may be transmitted over the NPUSCH in the NB-IoT as described above. In particular, the UE may transmit the UCI on the NPUSCH periodically, aperiodically, or semi-persistently according to the request/indication from the network (e.g., BS).

Initial Access Procedure in NB-IoT

FIG. 16 illustrates an example of an initial access procedure of NB-IoT.

The procedure in which the NB-IoT UE initially accesses the BS is briefly described in the section "General Signal Transmission and Reception Procedure in NB-IoT". Specifically, the above procedure may be subdivided into a procedure in which the NB-IoT UE searches for an initial cell and a procedure in which the NB-IoT UE obtains system information.

FIG. 16 illustrates a particular procedure for signaling between a UE and a BS (e.g., NodeB, eNodeB, eNB, gNB, etc.) for initial access in the NB-IoT. In the following, a normal initial access procedure, an NPSS/NSSS configuration, and acquisition of system information (e.g., MIB, SIB, etc.) in the NB-IoT will be described with reference to FIG. 16.

Each physical channel and/or a name of a physical signal may be differently set or referred to according to a wireless communication system to which NB-IoT is applied. For example, although the NB-IoT based on the LTE system is considered in FIG. 16, this is merely for convenience of description and details thereof are applicable to the NB-IoT based on the NR system. The details of the initial access procedure are also applicable to the MTC.

Referring to FIG. 16, the NB-IoT UE may receive a narrowband synchronization signal (e.g., NPSS, NSSS, etc.) from the BS (S2110 and S2120). The narrowband synchronization signal may be transmitted through physical layer signaling.

The NB-IoT UE may receive a master information block (MIB) (e.g., MIB-NB) from the BS on an NPBCH (S2130). The MIB may be transmitted through higher layer signaling (e.g., RRC signaling).

The NB-IoT UE may receive a system information block (SIB) from the BS on an NPDSH (S2140 and S2150). Specifically, the NB-IoT UE may receive SIB1-NB, SIB2-NB, etc. on the NPDSCH through the higher layer signaling (e.g., RRC signaling). For example, SIB1-NB may refer to system information with high priority among SIBs, and SIB2-NB may refer to system information with lower priority than SIB1-NB.

The NB-IoT may receive an NRS from the BS (S2160), and this operation may be performed through physical layer signaling.

Random Access Procedure in NB-IoT

FIG. 17 illustrates an example of a random access procedure of NB-IoT.

The procedure in which the NB-IoT UE performs random access to the BS is briefly described in the section "General Signal Transmission and Reception Procedure in NB-IoT". Specifically, the above procedure may be subdivided into a procedure in which the NB-IoT UE transmits a preamble to the BS and a procedure in which the NB-IoT receives a response for the preamble.

FIG. 17 illustrates a particular procedure for signaling between a UE and a BS (e.g., NodeB, eNodeB, eNB, gNB, etc.) for random access in the NB-IoT. In the following, detail of the random access procedure in the NB-IoT will be described based on messages (e.g., msg1, msg2, msg3, and msg4) used therefor.

FIG. 17 illustrates an example of the random access procedure in the NB-IoT. The name of each physical channel, physical signal, and/or message may vary depending on the wireless communication system to which the NB-IoT is applied. For example, although the NB-IoT based on the LTE system is considered in FIG. 22, this is merely for convenience of description and details thereof are applicable to the NB-IoT based on the NR system. The details of the initial access procedure are also applicable to the MTC.

Referring to FIG. 17, the NB-IoT may be configured to support contention-based random access.

First, the NB-IoT UE may select an NPRACH resource based on the coverage level of the corresponding UE. The NB-IoT UE may transmit a random access preamble (i.e., message 1, msg1) to the BS on the selected NPRACH resource.

The NB-IoT UE may monitor an NPDCCH search space to search for an NPDCCH for DCI scrambled with an RA-RNTI (e.g., DCI format N1). Upon receiving the NPDCCH for the DCI scrambled with the RA-RNTI, the UE may receive an RAR (i.e., message 2, msg2) from the BS on an NPDSCH related to the NPDCCH. The NB-IoT UE may obtain a temporary identifier (e.g., temporary C-RNTI), a timing advance (TA) command, etc. from the RAR. In addition, the RAR may also provide an uplink grant for a scheduled message (i.e., message 3, msg3).

To start a contention resolution procedure, the NB-IoT UE may transmit the scheduled message to the BS. Then, the BS may transmit an associated contention resolution message (i.e., message 4, msg4) to the NB-IoT UE in order to inform that the random access procedure is successfully completed.

By doing the above, the BS and the NB-IoT UE may complete the random access.

Discontinuous Reception (DRX) Procedure in NB-IoT

FIG. 18 illustrates an example of DRX mode in an idle state and/or an inactive state.

First, the definition of DRX is as follows.

The UE may perform a DRX operation while performing the above-described/proposed procedures and/or methods. The UE for which DRX is configured may lower power consumption by discontinuously receiving a DL signal. DRX may be performed in a radio resource control (RRC)_IDLE state, an RRC_INACTIVE state, or an RRC_CONNECTED state. In the RRC_IDLE state and the RRC_INACTIVE state, DRX is used to discontinuously receive a paging signal. Hereinafter, DRX performed in the RRC_CONNECTED state (RRC_CONNECTED DRX) will be described.

A DRX cycle includes an On-duration and an opportunity for DRX. The DRX cycle defines a time interval at which the On-duration is cyclically repeated. The On-Duration indicates a time duration that the UE monitors to receive a PDCCH. If DRX is configured, the UE performs PDCCH monitoring during the On-duration. If the PDCCH is successfully detected during PDCCH monitoring, the UE operates an inactivity timer and maintains an awoken state. If there is no PDCCH which has been successfully detected during PDCCH monitoring, the UE enters a sleep state after the On-duration is ended. Therefore, when DRX is configured, the UE may discontinuously perform PDCCH monitoring/reception in the time domain upon performing the above-described/proposed procedures and/or methods. For example, when DRX is configured, a PDCCH reception occasion (e.g., a slot having a PDCCH search space) in the present disclosure may be discontinuously configured according to DRX configuration. When DRX is not configured, PDCCH monitoring/reception may be continuously performed in the time domain upon performing the above-described/proposed procedures and/or methods. For example, when DRX is not configured, the PDCCH reception occasion (e.g., the slot having the PDCCH search space) in the present disclosure may be continuously configured. Meanwhile, PDCCH monitoring may be restricted in a time duration configured as a measurement gap regardless of whether DRX is configured or not.

Referring to Table 10, DRX configuration information is received through higher-layer (e.g., RRC) signaling. Whether DRX is ON or OFF is controlled by a DRX command of a medium access control (MAC) layer. If DRX is configured, the UE may discontinuously perform PDCCH monitoring upon performing the above-described/proposed procedures and/or methods in the present disclosure, as illustrated in FIG. 18.

TABLE 10

|  | Type of signals | UE procedure |
|---|---|---|
| 1st step | RRC signalling (MAC-CellGroupConfig) | Receive DRX configuration information |
| 2nd step | MAC CE ((Long) DRX command MAC CE) | Receive DRX command |
| 3rd step | — | Monitor a PDCCH during an on-duration of a DRX cycle |

Here, MAC-CellGroupConfig includes configuration information needed to configure a MAC parameter for a cell group. MAC-CellGroupConfig may also include configuration information regarding DRX. For example, MAC-CellGroupConfig may include information for defining DRX as follows.

- Value of drx-OnDurationTimer: defines the length of a starting duration of a DRX cycle.
- Value of drx-InactivityTimer: defines the length of a starting duration in which the UE is in an awoken state, after a PDCCH occasion in which a PDCCH indicating initial UL or DL data is detected.
- Value of drx-HARQ-RTT-TimerDL: defines the length of a maximum time duration until DL retransmission is received, after DL initial transmission is received.
- Value of drx-HARQ-RTT-TimerDL: defines the length of a maximum time duration until a grant for UL retransmission is received, after a grant for UL initial transmission is received.
- drx-LongCycleStartOffset: defines a time length and a starting time point of a DRX cycle.
- drx-ShortCycle (optional): defines a time length of a short DRX cycle.

Here, if any one of drx-OnDurationTimer, drx-InactivityTimer, drx-HARQ-RTT-TimerDL, and drx-HARQ-RTT-TimerDL is operating, the UE performs PDCCH monitoring in every PDCCH occasion while maintaining an awoken state.

Next an extended DRX (eDRX) cycle will be described.

According to DRX cycle configuration, a maximum cycle duration may be limited to 2.56 seconds. However, a UE that intermittently performs data transmission and reception, such as an MTC UE or an NB-IoT UE, may generate unnecessary power consumption during a DRX cycle. To further reduce the power consumption of the UE, a method of remarkably extending the DRX cycle based on a power saving mode (PSM) and a paging time window (or a paging transmission window) (PTW) has been introduced. The eDRX cycle is simply referred to as an eDRX cycle. Specifically, a paging hyper-frame (PH) is periodically configured based on a UE ID and the PTW is defined in the PH. The UE may configure the DRX cycle in a PTW duration to monitor a paging signal by switching to a wake-up mode in a PO thereof. One or more DRX cycles (e.g., a wake-up mode and a sleep mode) may be included in the PTW duration. The number of DRX cycles in the PTW duration may be configured through a higher-layer (e.g., RRC) signal by the BS.

While performing the foregoing general signal transmission and reception procedure of NB-IoT, the NB-IoT UE may switch to an idle state (e.g., RRC_IDLE state) and/or an inactive state (e.g., RRC_INACTIVE state) in order to reduce power consumption. The NB-IoT UE that has switched to the idle state and/or the inactive state may be configured to use DRX. As an example, the NB-IoT UE that has switched to the idle state and/or the inactive state may be configured to monitor a paging-related NPDCCH only in a specific subframe (or frame or slot) according to a DRX cycle configured by the BS. Here, the paging-related NPDCCH may imply an NPDCCH scrambled with a P-RNTI.

FIG. 19 illustrates an example of a DRX configuration and indication procedure for the NB-IoT UE.

A DRX configuration and indication for the NB-IoT UE may be provided as shown in FIG. 19. That is, FIG. 19 illustrates an example of a DRX configuration and indication procedure for the NB-IoT UE. However, the procedure in FIG. 19 is merely exemplary, and the methods proposed in the present disclosure are not limited thereto.

Referring to FIG. 19, the NB-IoT UE may receive DRX configuration information from the BS (e.g., NodeB, eNodeB, eNB, gNB, etc.) (S2410). In this case, the UE may receive the information from the BS through higher layer signaling (e.g., RRC signaling). The DRX configuration information may include DRX cycle information, a DRX offset, configuration information for DRX-related timers, etc.

Thereafter, the NB-IoT UE may receive a DRX command from the BS (S2420). In this case, the UE may receive the DRX command from the BS through higher layer signaling (e.g., MAC-CE signaling).

Upon receiving the DRX command, the NB-IoT UE may monitor an NPDCCH in a specific time unit (e.g., subframe, slot, etc.) based on the DRX cycle (S2430). The NPDCCH monitoring may mean a process of decoding a specific portion of the NPDCCH based on a DCI format to be received in a corresponding search space and scrambling a corresponding CRC with a specific predefined RNTI value in order to check whether the scrambled CRC matches (i.e. corresponds to) a desired value.

When the NB-IoT UE receives its paging ID and/or information indicating that system information is changed over the NPDCCH during the process shown in FIG. 19, the NB-IoT UE may initialize (or reconfigure) the connection (e.g., RRC connection) with the BS (for example, the UE may perform the cell search procedure of FIG. 15). Alternatively, the NB-IoT UE may receive (or obtain) new system information from the BS (for example, the UE may perform the system information acquisition procedure of FIG. 15).

FIG. 20 illustrates transmission of a wake-up signal (WUS).

An NB-IoT UE or a bandwidth reduced, low complexity/coverage enhancement (BL/CE) UE may use a WUS in order to reduce power consumption related to paging monitoring according to cell configuration. Upon configuration of the WUS, the following operation may be considered in an idle mode.

The WUS may indicate reception of paging in a corresponding cell by monitoring an MTC PDCCH (MPDCCH) or an NPDCCH to the UE.

For a UE for which eDRX is not configured, the WUS may be associated with one paging occasion (PO) (N=1). The PO represents a time resource/duration (e.g., a subframe or a slot) in which a PDCCH scrambled with a P-RNTI is transmittable for paging. One or plural POs may be included in a paging frame (PF), and the PF may be periodically configured based on a UE ID. The UE ID may be determined based on an international mobile subscriber identity (IMSI) of the UE.

In the case of the UE for which eDRX is configured, the WUS may be associated with one or more POs (N≥1) in a PTW. When eDRX is configured, a PH may be periodically configured based on the UE ID. The PTW is defined in the PH and the UE monitors PO(s) in the PF within the PTW.

Upon detecting the WUS, the UE may monitor N subsequent POs in order to receive a paging message.

A mobility management entity (MME) performing a paging operation is not aware that the BS uses the WUS.

Referring to FIG. 20, the WUS may be transmitted in a "Configured maximum WUS duration" (hereinafter, a WUS window) prior to a PO. Although the UE may expect repetitive transmission of the WUS in the WUS window, an actual number of times of WUS transmission may be smaller than the number of times of WUS transmission in the WUS window. For example, the number of repetitions of the WUS in good coverage may be small. For convenience, a resource/occasion in which the WUS is transmittable in the WUS window is referred to as a WUS resource. A WUS resource may be defined as a plurality of consecutive OFDM symbols and a plurality of consecutive subcarriers. The WUS resource may be defined as a plurality of consecutive OFDM symbols and a plurality of consecutive subcarriers in a subframe or a slot. For example, the WUS resource may be defined as 14 consecutive OFDM symbols and 12 consecutive subcarriers. A gap is present between the WUS window and the PO. The UE does not monitor the WUS in the gap. Upon detecting the WUS in the WUS window, the UE may monitor a paging-related signal in one or more POs related to the WUS (window). In the case of NB-IoT, the UE in an RRC_IDLE state may receive paging in an anchor carrier or a non-anchor carrier based on system information.

The terms used hereinbelow may be defined as follows: CDM (code division multiplexing), TDM (time division multiplexing), FDM (frequency division multiplexing), NWUS (narrowband wake-up signal), MWUS (MTC (machine type communication) wake-up signal), ZC sequence (Zadoff-Chu sequence), FFT (fast Fourier transform), OFDM (orthogonal frequency division multiplexing), SIB (system information block), RRC (radio resource control), PO (paging occasion), NPDCCH (narrowband physical downlink control channel), MPDCCH (machine type communication physical downlink control channel), MME (Mobility Management Entity), SINR (Signal to Interference and Noise Ratio), TAU (tracking area update), Rmax (the maximum number of repetitions of a PDCCH, an NPDCCH, or an MPDCCH), PRB (physical resource block), DRX (discontinuous reception), and eDRX (extended/enhanced discontinuous reception).

Meanwhile, a time resource unit may be a subframe or slot unit. At least one consecutive symbol may be one time resource unit. Hereinbelow, in the expression of a subframe, the subframe may define a configuration corresponding to a time resource unit including 14 consecutive symbols.

Monitoring of PO-Based Paging

In an LTE system, the UE may determine a location at which paging is to be monitored based on a PO and a PF determined based on UE_ID thereof. Such as determination operation is equally applied even to NB-IoT and MTC, which have been newly introduced in the 3GPP LTE Rel-13 standard. A plurality of UEs that expects paging in one PO may be present and the number of UEs may be determined according to setting or configuration using an SIB by the BS. Hereinafter, in the present disclosure, a group of plural UEs which may expect paging in the same PO will be defined as a UE-group-per-PO.

In the Rel-15 NB-IoT and MTC standard, a method of using a WUS has been introduced for power saving purposes of the UE. In this method, a UE capable of using the WUS (WUS-capable UE) attempts to detect the WUS based on information configured by the BS prior to monitoring a search space for paging. In this operation, upon detecting the WUS, the UE may monitor the search space for paging while expecting that paging will be transmitted in POs associated with a location at which the WUS has been detected. If the UE fails to detect the WUS, the UE may not monitor the search space for paging. According to definition in the Rel-15 standard, a WUS transmission location is determined to be a location relative to a PO indicated by the WUS, and all WUS-capable UEs that monitor the same PO share the same WUS and the same WUS transmission location. Therefore, if there is a WUS transmitted for a specific PO, all WUS-capable UEs belonging to a UE-group-per-PO corresponding to the PO should perform paging monitoring.

Paging may be transmitted only to partial UEs among UEs belonging to the same UE-group-per-PO according to determination of an MME or a BS. In the current standard, since information about to which UEs among UEs belonging to a UE-group-per-PO the WUS and the paging have been delivered is transmitted on an NPDSCH that transmits paging traffic, some UEs may perform unnecessary NPDCCH/NPDSCH decoding.

In light of the above problems, the present disclosure proposes criteria for applying the WUS based on UE subgrouping and methods of configuring the WUS in order to reduce an unnecessary paging monitoring operation of WUS-capable UEs. Each UE subgroup configured in the proposed methods of the present disclosure may be independently configured with the WUS distinguished by a time-domain resource, a frequency-domain resource, and/or a code-domain resource. In the following description, a specific time-domain resource, a specific frequency-domain resource, and/or a specific code-domain resource that may be configured for a specific UE subgroup for transmission and reception of the WUS will be defined as a WUS resource.

While the proposed method of the present disclosure will be described based on NB-IoT and MTC, it is apparent that the same technical idea is generally applied to an arbitrary communication system. In addition, while the proposed method of the present disclosure will be described based on a WUS indicating whether paging is transmitted in an idle mode, it is apparent that the same technical idea is generally applicable to an arbitrary signal or channel used to indicate additional information about a channel (or signal) having any purpose (e.g., information about whether the channel (or signal) is transmitted).

Although the proposed methods of the present disclosure may be performed independently of each other, it is apparent that they may be performed in combination, unless conflicting with each other.

More specifically, the UE receives configuration information related to the WUS from the BS by higher-layer signaling.

The UE receives the WUS from the BS during a configured maximum WUS duration. The WUS refers to a signal used to indicate whether the UE should monitor an NPDCCH on which paging is to be received (in a specific cell). The WUS is associated with one or more paging occasions (POs) depending on whether eDRX is configured.

FIG. 20 is a diagram illustrating an exemplary relationship between a WUS and a PO. A UE or a UE which has received the WUS may additionally perform the afore-described DRX operation and/or cell reselection operation.

A more specific UE operation and BS operation related to reception of a narrowband wake-up signal (NWUS) may be summarized as follows and may obviously be described in relation to methods described below.

The BS first generates a sequence (used) for the WUS in a specific time resource unit (or at least consecutive symbol, slot, or subframe). The BS maps the generated sequence to at least one RE and transmits the WUS on the mapped RE(s) to the UE. In concept, the at least one RE may include at least one of a time resource, a frequency resource, or an antenna port.

The UE receives the WUS from the BS. Alternatively, the UE may assume that the WUS is transmitted on specific RE(s) by the BS. The UE may then check (or determine) whether paging is received, based on the received WUS. When paging is transmitted, the UE receives the paging based on the afore-described paging reception-related operation and performs an operation of transitioning from an RRC idle mode to RRC connected mode.

UE Sub Criteria

In the present disclosure, when UE subgrouping is applied to WUS transmission and reception, conditions under which UE subgrouping is applied may be determined. A method is proposed in which the BS configures conditions under which UE subgrouping is applied and the UE recognizes the configured conditions and performs a paging monitoring-related operation according to UE subgrouping. UE subgrouping may be performed in one or more of the following Grouping Method 1-1, Grouping Method 1-2, Grouping Method 1-3, Grouping Method 1-4, Grouping Method 1-5, Grouping Method 1-6, and Grouping Method 1-7 in combination.

Grouping Method 1-1 proposes a method of performing UE subgrouping for a WUS based on UE_ID. Specifically, the definition of UE_ID used to determine a PO in 3GPP TS 36.304 V15.0.0 may apply to UE_ID used herein. That is, a PF, a PO, and a paging narrowband (PNB) may be determined based on DRX parameters provided in system information according to the following equations. Specifically, the PF is determined by the following equation.

$$SFN \bmod T = (T \text{ div } N)*(UE\_ID \bmod N) \quad \text{[Equation 7]}$$

Index $i_s$ indicating a PO from a time resource unit (or at least one consecutive symbol, slot, or subframe) pattern related to paging may be derived by Equation 8 below.

$$i_s = \text{floor}(UE\_ID/N) \bmod Ns \quad \text{[Equation 8]}$$

When a P-RNTI is monitored on an MPDCCH (or NPDCCH), the PNB is determined by Equation 9 below.

$$PNB = \text{floor}(UE\_ID/(N*Ns)) \bmod Nn \quad \text{[Equation 9]}$$

Parameters used in the above equations are defined as follows.

The parameters used in Equation 7 to Equation 9 are defined as follows: mod represents a modulo operation, floor represents a floor function, / represents division, * represents multiplication, div represents a function of obtaining a quotient, min(A, B) represents a smaller value of A and B, and max(A, B) represents a larger value of A and B.

T denotes a DRX cycle of the UE, nB denotes 4T, 2T, T, T/2, T/4, T/8, T/16, T/32, T/64, T/128, and T/256 and, for NB-IoT, also denotes T/512 and T/1024. N denotes min(T, nB), Ns denotes max(1, nB/T), Nn denotes the number of paging narrowbands (or the number of paging narrowbands for a P-RNTI monitored on an MPDCCH) or the number of paging carriers (or the number of paging carriers for the P-RNTI monitored on the MPDCCH) provided in system information Even Subgrouping Method As a characteristic example of Grouping Method 1-1, a method of evenly distributing UE_IDs to UE subgroups may be considered. In MTC, when the index of each UE subgroup is defined as $c_g$ based on UE_IDs, $c_g$ may be determined by Equation 10. In NB-IoT, when the index of each UE subgroup is defined as $c_g$ based on UE_IDs, $c_g$ may be determined by Equation 11. In Equation 10 and Equation 11, UE_ID, $N_s$, $N_n$, and W may be defined in Section 7 of 3GPP TS 36.302 V15.0.0. $N_{SG}$ represents the number of used subgroups. The UE may select a WUS resource (e.g., a time-domain, frequency-domain, and/or code-domain resource) corresponding to a UE subgroup index calculated by the following equation and monitor a WUS on the selected WUS resource.

$$c_g = \text{floor}(UE\_ID/(N^*N_s^*N_n)) \bmod N_{SG} \quad \text{[Equation 10]}$$

$$c_g = \text{floor}(UE\_ID/(N^*N_s^*W)) \bmod N_{SG} \quad \text{[Equation 11]}$$

Uneven Subgrouping Method

As another characteristic example of Grouping Method 1-1, a method of unevenly distributing UE_IDs to UE subgroups may be considered. The uneven distribution method may serve to reduce the selection frequency of a WUS resource corresponding to a specific UE subgroup. For example, when a WUS corresponding to a specific UE subgroup shares resources with a legacy WUS (e.g., a WUS for a UE to which UE subgrouping is not applied), the above distribution method may be intended to control effects on legacy WUS-capable UEs. When the index of each UE subgroup is defined as $c_g$ based on UE_IDs, $c_g$ may be determined to be a smallest index $c_g$ ($0 \leq c_g \leq N_{SG}$) satisfying Equation 12 in MTC and satisfying Equation 13 in NB-IoT. $N_{SG}$ represents the number of used subgroups. In Equation 12 and Equation 13, UE_ID, $N_s$, $N_n$, and W are defined in Section 7 of 3GPP TS 36.204 V15.0.0. In the following equations, $W_{WUS}(n)$ represents a weight for an n-th UE subgroup, for unevenly distributing UE_IDs belonging to each UE subgroup, and $W_{WUS}$ represents the sum of the weights of all subgroups (i.e., $W_{WUS} = W_{WUS}(0) + W_{WUS}(1) + \ldots + W_{WUS}(N_{SG}-1)$).

$$\text{floor}(UE\_ID/(N^*N_s^*N_n)) \bmod W_{WUS} < W_{WUS}(0) + W_{WUS}(1) + \ldots + W_{WUS}(c_g) \quad \text{[Equation 12]}$$

$$\text{floor}(UE\_ID/(N^*N_s^*W)) \bmod W_{WUS} < W_{WUS}(0) + W_{WUS}(1) + \ldots + W_{WUS}(c_g) \quad \text{[Equation 13]}$$

$W_{WUS}(n)$ corresponding to a specific index may be determined to be a weight for a subgroup using the same resource with a legacy WUS (e.g., $W_{WUS}(0)$).

The values of $W_{WUS}(n)$ may be signaled by an SIB or higher-layer signaling such as RRC signaling. This signaling may cause the BS to adjust distribution of UE_IDs per subgroup according to a situation. For example, the BS may configure $N_{SG}$ weights for the respective subgroups by the SIB. This operation may advantageously lead to flexible control of distribution ratios of UE_IDs for all subgroups. In another example, the BS may configure a weight (e.g., $W_{WUS}(0)$) for a subgroup using the same resource with a legacy WUS and a weight (e.g., $W_{WUS}(n)$, where n is not 0) for a subgroup using a different resource from the legacy WUS by the SIB. This operation may serve to evenly distribute UE_IDs between subgroups using resources distinguished from resources for the legacy WUS, while variably controlling effects on the legacy WUS. In another example, the BS may configure a ratio between a weight for a subgroup using the same resource with the legacy WUS and a weight for a subgroup using a different resource from the legacy WUS by the SIB. This operation may advantageously reduce signaling overhead under the premise that the resources used for the legacy WUS are always used for a specific subgroup. Instead of the ratio between the two weights, the weight for the subgroup using the same resource with the legacy WUS may always be fixed to 1, while only the weight for the subgroup using a different resource from the legacy WUS may be configured.

In another embodiment of unevenly distributing UE_IDs to UE subgroups, a method of evenly distributing the indexes of the UE subgroups (e.g., Equation 10 or Equation 11) and determining a WUS resource corresponding to each subgroup index by an SIB or higher-layer signaling such as RRC signaling may be used. In this case, mapping a plurality of subgroup indexes to a specific WUS resource may result in the effect of uneven distribution in the number of UE_IDs expected for each WUS resource.

Grouping Method 1-2 proposes a method of performing UE subgrouping for the WUS based on a coverage level. The coverage level refers to the state of a wireless channel environment of the UE. In an embodiment, a coverage level may be represented by a measurement value such as reference signal received power (RSRP)/reference signal received quality (RSRQ) measured by the UE or the magnitude of repetitive transmission or repetition that the UE uses to transmit and receive a UL or DL channel. An RSRP/RSRQ value may be represented as quality information related to channel quality.

When Grouping Method 1-2 is applied, the UE may be configured to inform the BS of information about a change in the coverage level. In an embodiment, when an RSRP/RSRQ value measured by the UE changes and thus does not satisfy the coverage level requirement of a current UE subgroup, the UE may report the change of the coverage level to the BS through a random access procedure. More specifically, the UE may use a UL data transmission scheme, such as early data transmission (EDT), in an idle mode to avoid unnecessary transition to an unnecessary RRC connected mode. To ensure stable reporting of the coverage level of the UE, the BS may configure an additional random access channel (RACH) resource for coverage level reporting and inform the UE of the configuration.

Grouping Method 1-3 proposes a method of performing UE subgrouping for the WUS by dedicated signaling from the BS. In a specific method of applying Grouping Method 1-3, UE-specific dedicated signaling may be dedicated RRC signaling that the UE obtains during RRC connection setup or in the RRC connected mode. For this purpose, a UE may be configured to report information required for configuring UE subgrouping (e.g., a coverage level, a type of service, and/or a capability) on an NPUSCH.

In an embodiment of applying Grouping Method 1-3, UE-specific dedicated signaling may be information that the UE obtains in a step for Msg2 or Msg4 of an RACH procedure. To this end, the UE may report information required for configuring UE subgrouping (e.g., a coverage level, a type of service, and/or a capability) in a step for Msg1 or Msg3.

Grouping Method proposes a method of performing UE subgrouping for the WUS based on the purpose of a corresponding channel indicated by the WUS. In other words, Grouping Method 1-4 proposes a method of applying UE subgrouping of the UE based on a corresponding channel indicated by the WUS. The corresponding channel refers to a channel about which the WUS indicates information.

In a specific method of applying Grouping Method 1-4 in relation to capability report, for UE subgrouping, the UE may be configured to report capability for a corresponding channel supported by the UE. After the UE reports information about the capability, the UE may be configured to perform UE subgrouping only when the BS provides the UE with additional signaling information. For example, the additional signaling information may be dedicated signaling as proposed in Grouping Method 1-3 or information that enables/disables WUS support for a specific corresponding channel obtainable in the RRC idle mode, such as an SIB.

Grouping Method 1-4 may be applied in relation to UE behavior and corresponding channel identification. In this case, after UE subgrouping is determined, the UE may be configured to monitor only a WUS corresponding to a UE subgroup thereof. When the WUS indicates multiple corresponding channels, the UE may identify information about a corresponding channel by comparing bit information included in a subsequent control channel or masked RNTIs or may finally confirm information about the corresponding channel on a data channel indicated by the subsequent control channel.

Alternatively when Grouping Method 1-4 is applied, after UE subgrouping is determined, the UE may be configured to monitor both a WUS corresponding to a UE subgroup thereof and an available WUS irrespective of a UE subgrouping capability. When a WUS indicates multiple corresponding channels, the UE may distinguish the corresponding channels indicated by the WUS by distinguishing WUS resources (e.g., time-domain, frequency-domain, and/or code-domain resources). Specifically, the UE may be configured to simultaneously monitor a WUS serving a purpose other than paging, which is distinguishable by a sequence and/or frequency in a specific time resource (e.g., a time resource unit duration determined by a gap from a PO and by a maximum duration) in which the UE monitors a WUS for paging. The UE may determine how a subsequent corresponding channel will be transmitted, based on the monitored WUS.

Embodiments of a corresponding channel in Grouping Method 1-4 other than paging DCI are as follows. In an example of Grouping Method 1-4, the defined corresponding channel may be a UL resource for preconfigured UL transmission (e.g., semi-persistent scheduling (SPS)). A WUS for which UE subgrouping has been performed may be used to activate/deactivate the use of the preconfigured UL resource or indicate whether ACK/NACK for the preconfigured UL resource is to be transmitted or retransmission is to be performed for the preconfigured UL resource.

In an example of Grouping Method 1-4, the defined corresponding channel may be a DL resource for preconfigured UL transmission (e.g., SPS). A WUS for which UE subgrouping has been performed may be used to indicate whether DCI providing information related to the preconfigured UL transmission is transmitted.

In an example of Grouping Method 1-4, the defined corresponding channel may be DCI masked by a G-RNTI (or single cell RNTI (SC-RNTI)) in single cell point-to-multipoint (SC-PTM). A WUS for which UE subgrouping has been performed may be used to indicate whether DCI masked by the group RNTI (G-RNTI) (or SC-RNTI) is transmitted or whether a single cell multicast transport channel (SC-MTCH) (or a single cell multicast control channel (SC-MCCH)) has been modified. When the WUS indicates whether the DCI masked by the G-RNTI is transmitted, different UE subgroups may be configured to correspond to different G-RNTIs. When both the DCI masked by the SC-RNTI and the DCI masked by the G-RNTI are subjected to UE subgrouping, a UE subgroup corresponding to the SC-RNTI and a UE subgroup corresponding to the G-RNTI may be configured to be different.

In an example of Grouping Method 1-4, the defined corresponding channel may have a multi-TB transmission structure. A WUS for which UE subgrouping has been performed may be used to activate/deactivate the use of the multi-TB transmission structure. Alternatively, the WUS may be used to indicate whether a subsequent corresponding channel is in a DCI format supporting multi-TB transmission or a DCI format supporting single-TB transmission. Multi-TB transmission refers to a transmission structure in which a plurality of traffic channels (e.g., (N)PDCCH or (N)PUSCH) is scheduled by one DCI (or a preconfigured resource without DCI).

Grouping Method 1-5 proposes a method of performing UE subgrouping for a WUS only based on a cell (or carrier) in which the UE has obtained UE subgrouping information and/or a method of applying UE subgrouping only to a cell in which the UE has obtained the UE subgrouping information. In NB-IoT, when the UE subgrouping information is provided carrier-specifically, the definition of the cell may be applied by replacing the cell with the carrier.

In Grouping Method 1-5, when UE subgrouping is applied according to specific criteria (e.g., UE_ID, a coverage level, dedicated signaling, and/or a corresponding channel), the UE may perform a UE subgrouping-related operation only for a cell for which the UE has been configured with the UE subgrouping information, skipping the UE subgrouping-related operation for a cell for which the UE has not been configured with the UE subgrouping information. The UE may not expect a WUS-related operation before obtaining the UE subgrouping information in an adjacent cell or a new cell or may perform the WUS-related operation in a WUS resource (e.g., a WUS defined in Rel-15) which may be monitored UE-commonly irrespective of UE subgrouping criteria.

Grouping Method 1-6 proposes a method of performing UE subgrouping of the WUS based on a time passed after the last UL transmission and/or DL reception and/or a method of determining the UE to be included in a specific UE subgroup based on a time of completing the last UL transmission and/or DL reception, and then to be switched to another UE subgroup a predetermined time later or skip UE subgrouping before the next UL transmission and/or DL reception is completed. The proposed method may be useful when there is a low possibility that the UE will be paged during a predetermined time after transmitting or receiving traffic.

In a specific method of applying Grouping Method 1-6, a channel on which UL transmission and/or DL reception is performed may be applied only when the BS and the UE are capable of confirming transmission and/or reception. For example, this case may correspond to the case in which the UE and the BS exchange information as in EDT, the case in which feedback indicating whether a specific channel has been received may be transmitted on a HARQ-ACK channel, or the case of an RRC message.

Grouping Method 1-7 proposes a method of hopping a subgroup index of the UE and/or a method of hopping a WUS subgroup index of the UE hops over time when there is a fixed WUS resource corresponding to each subgroup index. This operation may serve to prevent continuous performance degradation caused by the use of a specific WUS resource by the UE, when there is a difference in feature or gain between WUS resources used for subgrouping.

In a specific method of applying Grouping Method 1-7, the UE may hop the subgroup index of a corresponding WUS in each PO. A selected subgroup index may be maintained unchanged during a time period in which WUS transmission starts and is repeated.

In a specific method of applying Grouping Method 1-7, when subgroup index hopping is determined by a system frame number (SFN), a parameter such as floor(SFN/T) may be used to achieve hopping effects. In a characteristic example, when a subgroup index is hopped every period of a DRX cycle, the value of T may be determined to be the value of the DRX cycle. Here, floor( ) denotes a floor function.

In an embodiment of Grouping Method 1-7, when the UE_ID-based even distribution method proposed in Grouping Method 1-1 and subgroup index hopping are applied, a subgroup index may be determined by Equation 14 for MTC and by Equation 15 for NB-IoT.

$$c_g = [\text{floor}(UE\_ID * N_S * N_n)) + \beta] \bmod N_{SG} \quad [\text{Equation 14}]$$

$$c_g = [\text{floor}(UE\_ID * N_S * W)) + \beta] \bmod N_{SG} \quad [\text{Equation 15}]$$

Alternatively, in an embodiment of Grouping Method 1-7, when the UE_ID-based uneven distribution method proposed in Grouping Method 1-1 and subgroup index hopping are applied, a subgroup index may be determined by Equation 16 for MTC, and Equation 17 for NB-IoT. In Equations 14 to 17,13 is a parameter used to achieve subgroup index hopping effects, which is defined as a variable determined by a reference value distinguishable on the time axis. For example, when an SFN and a DRX cycle are used as references, β may be defined in the form of β=floor(SFN/T). For parameters other than β and operations, Equations 10 to 13 are used in the same manner.

$$[\text{floor}(UE\_ID * N_S * N_n)) + \beta] \bmod W_{WUS} < W_{WUS}(0) + W_{WUS}(1) + \ldots + W_{WUS}(c_g) \quad [\text{Equation 16}]$$

$$[\text{floor}(UE\_ID/(N * N_S * W)) + \beta] \bmod W_{WUS} < W_{WUS}(0) + W_{WUS}(1) + \ldots + W_{WUS}(c_g) \quad [\text{Equation 17}]$$

In another method to achieve the same effects as Grouping Method 1-7, a mapping relationship between subgroup indexes and WUS resources may be changed over time, with the subgroup index of the UE fixed.

UE Subgrouping Configuration

The present disclosure proposes a method of configuring related information by the BS and operations performed by the UE (or operations based on UE subgrouping), in order to apply UE subgrouping to WUS transmission and reception. One or more of the following Grouping Method 2-1, Grouping Method 2-2, Grouping Method 2-3, and Grouping Method 2-4 may be used in combination as a method of configuring UE subgrouping.

Grouping Method 2-1 proposes a method of determining a unit for applying UE subgrouping information or a method of determining a range to which the UE subgrouping configuration is applied and related operations when UE subgrouping is configured.

In Grouping Method 2-1, a unit for which the UE subgrouping information is configured may be a cell in order to reduce signaling overhead. Alternatively, when hopping is applied to a WUS, the same WUS configuration may be maintained irrespective of the transmission position (e.g., narrowband or carrier) of the WUS.

Alternatively, a unit for which the UE subgrouping information is configured may be a carrier in NB-IoT. Since a WUS is repeated a different number of times, power boosting is available or unavailable, or a different number of resources is available in each carrier, a carrier may be set as the unit in order to control the type of UE subgrouping or the number of UE subgroups, or enable/disable UE subgrouping in consideration of the difference. In MTC, the term carrier may be replaced with narrowband. When frequency hopping is applied between narrowbands, a UE subgrouping criterion may be determined to be a narrowband carrying a corresponding channel indicated by the WUS.

A unit for which UE subgrouping is configured may be a corresponding channel indicated by the WUS. For example, when UE subgrouping is applied to paging, a carrier (or narrowband) for which UE subgrouping is supported may be limited to a carrier carrying paging. Alternatively, when UE subgrouping is applied to SC-PTM, SPS, or multi-TB transmission, a UE subgrouping operation may be performed (or the UE subgrouping operation may be configured to be performed) only on a carrier (or narrowband) in which a transmission and reception structure for each purpose (or a purpose for SC-PTM, SPS, or multi-TB transmission) is operated.

Grouping Method 2-2 proposes a method of determining whether UE subgrouping is applied according to the gap capability of the UE.

In Grouping Method 2-2, UE subgrouping configuration may be differentiated according to the WUS-to-PO gap capability of the UE. The WUS-to-PO gap capability refers to a UE capability used to determine the size of a gap configured between an ending time resource unit (or an ending slot or an ending subframe) of the WUS and a PO and may be defined as in 36.304 V15.0.0. In other words, the gap capability of the UE is related to the size of a time gap between the WUS and the PO, supportable by the UE. For example, the gap capability of the UE may be present for sizes of {40 ms, 240 ms, 1 s, 2 s} based on sizes with which a WUS-to-PO gap is configurable. The configurable gap sizes may be grouped into a short gap capability and a long gap capability. For example, the gap capability of the UE may be grouped into the long gap capability with which a WUS-to-PO gap of {1 s, 2 s} is configurable in an eDRX-based operation and the short gap capability with which a WUS-to-PO gap of {40 ms, 240 ms} is configurable in the eDRX-based operation. In this case, a higher-layer signal may include an independent field for each of the long gap capability and the short gap capability. That is, the higher-layer signal may be designed to have an independent field for each group of the WUS-to-PO gap capability.

Alternatively, a configuration related to UE subgrouping may be independently set for each WUS-to-PO gap capability. Specifically, a higher-layer signal carrying UE subgrouping-related configuration information may be designed to have an independent field for each WUS-to-PO gap capability.

Alternatively, UE subgrouping may not be applied to a UE having a specific WUS-to-PO gap capability. For example, UE subgrouping may be set (or configured) not to be applied to a larger gap-capable UE. For example, the larger gap-capable UE may be a UE configurable with a WUS-to-PO gap of {1 s, 2 s} in an eDRX situation. Alternatively, UE subgrouping may be set (or configured) not to be applied to a shorter gap-capable UE. For example, the shorter gap-capable UE may be a UE unconfigurable with the WUS-to-PO gap of {1 s, 2 s} in the eDRX situation.

Considering that the implementation complexity and performance of a WUS detector may be different according to a WUS-to-PO gap capability, the proposed method may be intended to reduce an increase in UE complexity for UE subgrouping or the degradation of WUS detection performance for a UE having a capability with a relatively low requirement (e.g., a larger gap capability). In other words, according to Grouping Method 2-2, in consideration of different complexity and performance of the WUS detector according to the gap capability, UE subgrouping may not be applied to or may be limitedly applied to the larger gap-capable UE in order to prevent complexity of the larger gap-capable UE from increasing or WUS detection performance from being degraded.

Alternatively, the method may be intended to reduce the degradation of WUS detection performance caused by UE subgrouping for the shorter gap-capable UE in order to secure a sufficient time required to prepare for monitoring a corresponding channel after fast WUS detection. In other words, according to Grouping Method 2-2, the shorter gap-capable UE needs to secure a sufficient time required to prepare to monitor a corresponding channel after fast WUS detection. To this end, UE subgrouping may not be applied or may be limitedly applied to the shorter gap-capable UE.

Grouping Method 2-3 proposes a method of determining whether UE subgrouping is applied according to the size of a gap configured by the BS.

In Grouping Method 2-3, UE subgrouping configurations may be differentiated according to a configured size of a WUS-to-PO gap. The size of the WUS-to-PO gap refers to the size of a gap configured between an ending time resource unit (or an ending slot or an ending subframe) of a WUS and a PO and may be defined as in 3GPP TS 36.304 V15.0.0. That is, the gap mentioned in Grouping Method 2-3 may be defined as a gap shown in the afore-described illustration (e.g., FIG. 20) related to the WUS timing.

Specifically, a configuration related to UE subgrouping may be independently set for each WUS-to-PO gap size. In an embodiment, the BS may configure two or more gaps corresponding to one PO, and the higher-layer signal carrying UE subgrouping-related configuration information may include (or may be designed to have) an independent field for each WUS-to-PO gap size.

Alternatively, UE subgrouping may not be applied for a specific WUS-to-PO gap size. For example, UE subgrouping may not be applied to a larger gap (or a larger gap-capable UE). This is because for a larger gap, a separate WUS receiver operating with low complexity may be applied, and in this case, degradation of WUS performance caused by UE subgrouping may be relatively serious. Here, the larger gap may be a gap with a size of {1 s, 2 s} configured in an eDRX situation. Alternatively, UE subgrouping may not be applied to a shorter gap. The present disclosure serves to secure an extra spacing by shortening an actual transmission duration instead of performing UE subgrouping because there is a relative shortage of an extra spacing between a WUS and a PO.

Alternatively, UE subgrouping may be applied depending on whether the UE performs an eDRX operation. For example, UE subgrouping may not be applied when the UE performs the eDRX operation. This is intended to prevent the degradation of WUS detection performance caused by UE subgrouping because missed paging may lead to a fatal delay to the next paging transmittable time in eDRX. Alternatively, in another embodiment for the same purpose, a separate configuration may be used, which distinguishes UE subgrouping for an eDRX operation from UE subgrouping for a DRX operation. Here, the configuration may concern allocation of a WUS resource or a time gap between the PO and the WUS resource. In other words, a WUS configuration of UE subgrouping for a UE performing the DRX operation may be set separately from a WUS configuration of UE subgrouping for a UE performing the eDRX operation. That is, according to a WUS configuration of UE subgrouping, the UE performing the DRX operation may be grouped as a subgroup different from a subgroup of the UE performing the eDRX operation.

Grouping Method 2-4 proposes a method of reporting information related to mobility of the UE for UE subgrouping by the UE. Here, the mobility may be related to change in a communication channel environment, caused by movement of the UE to another physical position.

Specifically, the UE may autonomously determine whether to perform UE subgrouping based on mobility thereof and report the determination to the BS. In the presence of a UE subgrouping request report based on the mobility of the UE, the BS may transmit the WUS by applying a UE subgrouping-related operation for the UE that has reported the request. The UE may identify that the UE subgrouping operation is possible at a transmission position at which the UE expects the WUS and perform the UE subgrouping-related operation after transmitting a UE subgrouping-capable report based on mobility thereof to the BS. Alternatively, the UE may start UE subgrouping after receiving separate confirmation signaling for the report. In this method, (1) a reference predetermined in a standard or (2) a reference configurable by higher-layer signaling from the BS may be used as reference mobility for determining whether to perform UE subgrouping by the UE.

Alternatively, the UE may report information about mobility thereof to the BS, and the BS may determine whether UE subgrouping is to be applied based on the reported information about mobility and configure application of UE subgrouping for the UE. After reporting the information about mobility measured by the UE, the UE may expect signaling indicating whether UE subgrouping is to be applied from the BS. Upon acquisition of information related to UE subgrouping, the UE may determine whether to apply UE subgrouping according to the received information. Whether the UE fails to acquire the information about UE subgrouping, the UE may (be configured to) monitor a common WUS (e.g., a WUS identifiable by all WUS-capable UEs irrespective of UE subgroups), without expecting a UE subgrouping-related operation.

Alternatively, when the BS operates UE subgrouping based on a plurality of criteria or purposes, the mobility-based report may be restrictively reflected in (or applied to) specific UE subgrouping criteria. Specifically, because the coverage level of the UE with mobility may change over time, whether coverage level-based UE subgrouping is to be applied may be determined according to a mobility-based report. In contrast, a criterion such as UE_ID is applicable without much relation to the mobility of a UE, UE_ID-based UE subgrouping may always be applied irrespective of information about the mobility-based report.

Selecting WUS Multiplexing Resource Based on WUS Parameters

A WUS multiplexing scheme between UE subgroups may be determined based on (or differently determined according to) determination of WUS resources according to WUS-related parameters.

Resource selection (RSEL) Method 1 proposes methods of determining a multiplexing scheme between UE subgroups according to the WUS capability of the UE. That is, according to RSEL Method 1, the multiplexing scheme between UE subgroups may be determined based on the WUS capability of the UE. The WUS capability may concern a gap size between a WUS and a PO, for the UE (or required by the UE). When the WUS capability is a difference in implementation between WUS detection and a subsequent operation of the UE, the present disclosure according to RSEL Method 1 may select an appropriate (or proper) multiplexing scheme in consideration of such an implementation feature of the UE (or in consideration of up to the implementation feature of the UE).

In an embodiment of RSEL Method 1, a situation in which a long gap capability having a relatively large value and a short gap capability having a relatively small value, such as a gap capability of eDRX defined in Rel-15 NB-IoT/MTC, coexist may be considered. Here, the long gap capability is targeted at receiver (or UE) that has relatively low complexity and requires low power consumption, and the short gap capability is targeted at a receiver that has higher complexity than the long gap capability and consumes high power. In the multiplexing scheme to which CDM for UE subgrouping rather than distinguishing the gap capability is applied, the UE needs to simultaneously blind-decode a WUS for group common indication and a WUS for subgroup-specific indication. In contrast, when only TDM (or FDM) is applied for UE subgrouping rather than distinguishing the gap capability, since a monitoring WUS resource of the UE is one, a target to be blind-decoded may not increase. In consideration of such characteristics, only multiplexing between UE subgroups using TDM (or FDM) may be possible at a location of a gap for a UE having the long gap capability. In this case, UE subgrouping of the CDM scheme may be determined not to be supported. In contrast, a UE subgrouping operation using CDM may be allowed at a location of a gap for a UE with the short gap capability.

RSEL Method 2 proposes methods of determining an operation scheme of a WUS resource based on a degree at which UE_IDs per PO are distributed. The distributed degree of UE_IDs may be an estimated value based on configuration information that the BS signals for a paging-related operation and may be different from the number of UEs that are connected to an actual corresponding cell and expect paging. In this case, the configuration information for the paging-related operation may include the number of paging carriers used in NB-IoT, information about weights assigned to the respective paging carriers, a DRX cycle of a PO, and the number of POs for different UE_ID groups. The above parameters may be used to estimate a maximum number of UE_IDs that expect paging for one PO. Alternatively, when some of the above configuration information is used as a parameter of a function capable of estimating the distributed degree of predefined UE_IDs, the number of WUS resources may be determined based on a result value of the function. According to RSEL Method 2, the distributed degree of UE_ID is used as advance information so that the present disclosure may reflect an actually required number of WUS resources through prediction and thus prevent unnecessary consumption of the WUS resources.

RSEL Method 3 proposes methods of determining an operation scheme of a WUS resource based on an operation mode. According to RSEL Method 3, the operation scheme of the WUS resource may be determined based on an operation mode used in a system in which a plurality of operation modes such as in NB-IoT is present. In RSEL Method 3, the WUS resource operation scheme may be determined by considering the difference in performance according to the difference in the number of OFDM symbols used in one time resource unit (or one slot or one subframe) based on an operation mode of NB-IoT. For example, in an in-band operation mode, the number of OFDM symbols available in one subframe is 11 and the OFDM symbols may include RE puncturing to secure CRS transmission. In contrast, guard-band and standalone operation modes may use all of 14 OFDM symbols in one subframe and are not affected by RE puncturing caused by a CRS. From this viewpoint, the UE in the guard-band and standalone operation modes may exhibit relatively good WUS detection performance under the assumption that the UE uses the same power as in the in-band operation mode. In consideration of such a characteristic, the number of code-domain resources used may be differently determined according to an operation mode. For example, the number of code-domain resources used in multiplexing between UE subgroups of a CDM scheme may be fixed by standard. Alternatively, the number of code-domain resources may be determined to be larger in the guard-band and standalone operation modes than in the in-band operation mode.

RSEL Method 4 may include a WUS resource selection method considering the case in which a WUS parameter for the UE of an eDRX state may be optionally configured. RSEL Method 4 proposes methods of determining whether to apply an optional configuration of a WUS parameter according to whether the UE operates based on DRX or eDRX and according to a gap size. RSEL Method 4 may consider a structure in which, when UE subgrouping for the WUS is applied, at least one WUS parameter configuration should be set for UEs to which UE subgrouping is applied and an additional WUS parameter configuration is optionally set according selection of the BS. For convenience of description, one WUS parameter configuration that should be at least secured is defined as WUS-Con-A and a WUS parameter configuration that may be additionally set is defined as WUS-Con-B. When the number of WUS parameter configurations that may be additionally set is 2, the two WUS parameter configurations are represented as WUS-Con-B1 and WUS-Con-B2, respectively, and are collectively referred to as WUS-Con-B. At least two of WUS-Con-A, WUS-Con-B1, or WUS-Con-B2 may be represented as a first WUS configuration and a second WUS configuration or as a third WUS configuration and a fourth WUS configuration.

RSEL Method 4 may additionally apply at least one method (or a combined method) of RSEL Method 4-0, RSEL Method 4-1, RSEL Method 4-2, RSEL Method 4-3, or RSEL Method 4-4. When the BS supports one or more of RSEL Method 4-0, RSEL Method 4-1, RSEL Method 4-2, RSEL Method 4-3, and RSEL Method 4-4, the BS may select one or more of RSEL Method 4-0, RSEL Method 4-1, RSEL Method 4-2, RSEL Method 4-3, and RSEL Method 4-4 and inform the UE of the selected methods.

RSEL Method 4-0 proposes methods of determining a WUS parameter to which RSEL Method 4 is applied based on a time/frequency resource of the WUS and/or the number of UE subgroups. The time/frequency resource of the WUS may be related to whether TDM or FDM is applied. For example, the time/frequency resource of the WUS and/or the number of UE subgroups may correspond to a value of the WUS parameter to which RSEL Method 4 is applied.

RSEL Method 4-1 proposes methods of applying WUS-Con-B (or the first WUS configuration) only to a UE in an eDRX state. WUS-Con-A (or the second WUS configuration) may be applied to a UE in a DRX state. When only WUS-Con-A is present and WUS-Con-B is not set, all UEs to which UE subgrouping is applied may operate based on WUS-Con-A. In RSEL Method 4-1, when a WUS-to-PO gap size for DRX and a WUS-to-PO gap size for an eDRX short gap are equally set, WUS-Con-A may be applied to UEs to which UE subgrouping using the eDRX short gap is applied regardless of whether WUS-Con-B is present. In this case, WUS-Con-B may be applied to UEs using an eDRX long gap in the presence of WUS-Con-B.

According to RSEL Method 4-1, UEs using the same WUS-to-PO gap may be configured to expect the same WUS regardless of DRX/eDRX. Then, a WUS overlap problem of in which different WUSs should be transmitted on the same WUS resource may be prevented.

RSEL Method 4-2 proposes methods of applying WUS-Con-B (or the first WUS configuration) only to the UE in the eDRX state and applying WUS-Con-A (or the second WUS configuration) to the UE in the DRX state. When only WUS-Con-A is set and WUS-Con-B is not set, all UEs to which UE subgrouping is applied may operate based on WUS-Con-A. Alternatively, when WUS-Con-B is set, the UE in the eDRX state may always operate based on WUS-Con-B. In this case, even when the WUS-to-PO gap size for DRX and the WUS-to-PO gap size for the eDRX short gap are equally set, the UE using the eDRX short gap may operate based on WUS-Con-B. When the BS intends to equally treat the UE in the DRX state and the UE in the eDRX short gap state, the BS may not set WUS-Con-B. According to RSEL Method 4-2, the BS may support additional optimization for the UE in the eDRX short gap.

RSEL Method 4-3 proposes methods of applying WUS-Con-B only to the UE in the eDRX state. In this case, WUS-Con-B may independently set WUS-Con-B1 for the eDRX short gap and WUS-Con-B2 for the eDRX long gap.

In RSEL Method 4-3, when only WUS-Con-A is set and WUS-Con-B1 and WUS-Con-B2 are not set, all UEs performing UE subgrouping may (be configured to) operate based on WUS-Con-A. When WUS-Con-A and WUS-Con-B1 are set and WUS-Con-B2 is not set, the UE of the DRX state may (be configured to operate based on WUS-Con-A and the UEs of the eDRX may (be configured to) operate based on WUS-Con-B1. When WUS-Con-A and WUS-Con-B2 are set and WUS-Con-B1 is not set, the UE of the DRX state and the UE of the eDRX short gap state may (be configured to) operate based on WUS-Con-A and the UE of the eDRX long gap state may (be configured to) operate based on WUS-Con-B2. When all of WUS-Con-A, WUS-Con-B1, and WUS-Con-B2 are set, the UE of the DRX state may (be configured to) operate based on WUS-Con-A, the UE of the eDRX short gap state may (be configured to) operate based on WUS-Con-B1, and the UE of the eDRX long gap state may (be configured to) operate based on WUS-Con-B2.

According to RSEL 4-3, since WUS parameters for the eDRX short gap and the eDRX long gap may be independently set, network flexibility may be improved. According to RSEL Method 4-3, even when only some WUS parameters are simultaneously set, the UE may determine the WUS parameters which are a reference of UE subgrouping.

RSEL Method 4-4 proposes methods of applying WUS-Con-B2 only to the UE of the eDRX long gap state and determining a WUS parameter of WUS-Con-B2 by another WUS parameter configuration (e.g., WUS-Con-A or WUS-Con-B1). In this case, when the eDRX long gap is not configured in a corresponding cell, WUS-Con-B2 may not be set.

According to RSEL Method 4-4, WUS-Con-B2 may be set only when the eDRX long gap that the BS may optionally configure is supported and the UE of the eDRX long gap state may (be configured to) operate based on WUS-Con-B2. In this case, WUS-con-B2 may not be applied to the UE of the DRX state and the UE of the eDRX short gap state. When there is WUS-Con-B1, the UE of the eDRX short gap may (be configured to) conform to WUS-Con-B1. Alternatively, when there is no WUS-Con-B1, the UE of the eDRX short gap state may (be configured to) conform to WUS-Con-A.

Alternatively, in RSEL Method 4-4, WUS-Con-B2 may be (or may be configured as) a subset of a WUS parameter configured in WUS-Con-A. For example, when there is no WUS-Con-B1 and two WUS resources which are subjected to TDM in WUS-Con-A are configured, WUS-Con-B2 may be configured to correspond (or be equal) to other WUS parameters except for the WUS resources of TDM in WUS-Con-A (i.e., when only one time-domain WUS resource is selected). Alternatively, when WUS-Con-B1 is configured to have two WUS resources which are subjected to TDM, WUS-Con-B2 may be configured to correspond (or be equal) to other WUS parameters except for the WUS resources of TDM in WUS-Con-A (i.e., when only one time-domain region WUS resource is selected). In the above embodiments, only one time-domain WUS resource is configured for WUS-Con-A or WUS-Con-B1 (i.e., when a WUS resource of a TDM scheme is not configured), information about WUS-Con-B2 may be configured to be equal to WUS-Con-A or WUS-Con-B1. When the above method is applied, information about WUS-Con-B may be represented by sharing signaling information of WUS-Con-A so that signaling overhead may be reduced. In addition, in the case of the eDRX long gap, since a WUS-to-PO gap size is relatively large, it may be improper to additionally apply TDM. According to RSEL Method 4-4, the present disclosure may prevent an increase in a paging delay caused by adding the time-domain WUS resource.

FIG. 21 illustrates a configuration for a method of transmitting a WUS according to an embodiment.

Referring to FIG. 21, the BS may generate or set a group WUS configuration related to a configuration of a WUS or a WUS resource for UE subgrouping for each UE group (S911). The group WUS configuration may include WUS configuration information related to applying UE subgrouping. The BS may generate the group WUS configuration including a first WUS configuration for UEs operating based on eDRX and a second WUS configuration for UEs operating based on DRX distinguished from the first WUS configuration. Here, a plurality of UEs may be grouped into a UE subgroup for UEs according to the first WUS configuration (or UEs operating based on eDRX) and a UE subgroup for UEs according to the second WUS configuration (or UEs operating based on DRX), based on the group WUS configuration transmitted by the BS.

Here, the first WUS configuration and the second WUS configuration may be configurations corresponding to at least two of WUS-Con-A, WUS-Con-B1, or WUS-Con-B2. Alternatively, a third WUS configuration and a fourth WUS configuration may be configurations corresponding to at least two of WUS-Con-A, WUS-Con-B1 or WUS-Con-B2.

Alternatively, the first WUS configuration may include WUS resource allocation information distinguished from the second WUS configuration or information about a configuration for a time gap between a WUS resource and a PO, distinguished from the second WUS configuration. UEs operating based on eDRX and UEs operating based on DRX may be grouped into different subgroups according to the WUS resource allocation information or the time gap. Here, the WUS resource allocation information may include allocation information about at least one domain resource of a time-domain resource, a frequency-domain resource, or a code-domain resource. In this case, a WUS resource according to the first WUS configuration may be distinguished from the WUS resource according to the second WUS configuration in at least one of the time domain, the frequency domain, or the code domain. In other words, the WUS resource according to the first WUS configuration may be subjected to time division multiplexing (TDM), frequency division multiplexing (FDM), or code division multiplexing (CDM) with the WUS resource according to the second WUS configuration. The BS may group WUSs by distinguishing between the WUS resource according to the first WUS configuration and the WUS resource according to the second WUS configuration by a combination of at least one of TDM, CDM, or FDM.

Alternatively, the BS may generate the first WUS configuration set differently (or set to be distinguished) according to the gap capability of the UE performing the eDRX operation. In other words, the first WUS configuration may be set differently (or set to be distinguished) according to the gap capability of the UE performing the eDRX operation. Here, the gap capability of the UE is related to the size of a WO-to-PO time gap supportable by the UE as described above. For example, the gap capability of the UE is classified into a larger gap capability capable of setting a WUS-to-PO time gap having a size of {1 s, 2 s} in an eDRX-based operation and a shorter gap capability incapable of setting a WUS-to-PO time gap having a size of {1 s, 2 s} in the eDRX-based operation. That is, the BS may generate or set the first WUS configuration divided into the third WUS configuration for a shorter gap-capable UE and the fourth WUS configuration for a longer-gap capable UE. Here, the BS may previously receive a report on information about the gap capability of the UE from the UE before setting the group WUS configuration for the UEs. In this case, the BS may set the group WUS configuration based on the reported gap capability of the UE.

Alternatively, the BS may not apply grouping based on the first WUS configuration when the UE operating based on eDRX has a specific gap size. For example, the BS may limit the allocation of the WUS resource according to the first WUS configuration to a UE having a gap capability of 1 s or 2 s (longer gap-capable UE) even when the UE operates based on eDRX. In this case, the UE (i.e., the UE to which the first WUS configuration is not applied) is not assigned the WUS resource according to the first WUS configuration, so subgrouping is not applied and the WUS may be detected on a WUS resource commonly applied between UEs. In contrast, since the UE having the shorter gap capability is assigned the WUS resources according to the first WUS configuration, subgrouping may be applied to the UE having the shorter gap capability by the first WUS configuration.

As an alternative example, the BS may limit the allocation of the WUS resource according to the first WUS configuration to a UE having no gap capability of 1 s or 2 s (shorter gap-capable UE) even when the UE operates based on eDRX. In this case, the UE (i.e., the UE to which the first WUS configuration is not applied) is not assigned the WUS resource according to the first WUS configuration, so subgrouping is not applied and the WUS may be detected on a WUS resource commonly applied between UEs. In contrast, since the UE having the longer gap capability is assigned the WUS resources according to the first WUS configuration, subgrouping may be applied to the UE having the longer gap capability by the first WUS configuration.

Alternatively, the BS may differently set the group WUS configuration for the UE according to a WUS-to-PO time gap size. The BS may differently set the first WUS configuration according to the WUS-to-PO time gap size and differently set the second WUS configuration according to the WUS-to-PO time gap size. For example, if the BS is capable of setting a first time gap and a second time gap for the group WUS configuration, the BS may independently set or generate WUS configuration information for the first time gap and WUS configuration information for the second time gap. Alternatively, when the BS is capable of setting a plurality of time gaps, the BS may configure the group WUS configuration such that WUS subgrouping is not applied to a time gap exceeding (or less than or equal to) a preset size.

The BS may transmit not only the group WUS configuration that sets specific UEs to be grouped to monitor the WUS, but also a WUS configuration (i.e., a legacy WUS configuration) that sets a common WUS resource between UEs. Alternatively, the WUS configuration that sets the common WUS resource between UEs may be derived from the group WUS configuration under a specific condition (or according to application of a specific value).

Next, the BS may transmit the set or generated group WUS configuration to a plurality of UEs (S913). The group WUS configuration may be transmitted (or multicast or broadcast) to a plurality of UEs through a physical-layer signal or a higher-layer signal. When the BS signals the group WUS configuration through the higher-layer signal, the BS may signal the group WUS configuration to the plurality of UEs through a higher-layer signal configuring a field for each WUS configuration. Specifically, when the group WUS configuration is divided into the first WUS configuration for eDRX and the second WUS configuration for DRX, the first WUS configuration and the second WUS configuration may be included in respective independent fields and signaled by the higher-layer signal. Alternatively, when the WUS configuration is divided into the third WUS configuration and the fourth WUS configuration according to the gap capability of the UE, the third WUS configuration and the fourth WUS configuration may be included in respective independent fields and signaled by the higher-layer signal. Alternatively, when the group WUS configuration is divided according to the time gap size, the BS may include a WUS configuration corresponding to each WUS-to-PO gap size in each independent field and signaled by the higher-layer signal.

Next, the BS may transmit a corresponding WUS for each UE subgroup based on the group WUS configuration (S915). The BS may subgroup a plurality of UEs through the group WUS configuration and transmit a corresponding WUS for each UE subgroup. For example, the BS may divide WUS resources according to each UE subgroup using at least one of TDM, FDM, or CDM and transmit a corresponding WUS on each divided WUS resource. This operation is based on the premise that the BS transmits the WUS on a WUS resource for a UE subgroup on which a paging signal is to be monitored in a PO.

In addition, the UE may specify a WUS resource corresponding to a subgroup thereof among subgrouped WUS resources and monitor whether the WUS is detected (or received) on the specified WUS resource. Alternatively, when the UE is not subgrouped from the WUS configuration information, the UE may monitor whether to receive the WUS on a WUS resource (i.e., legacy WUS resource) commonly applied between UEs by the BS.

FIG. 23 illustrates a wireless device applicable to the present disclosure.

Referring to FIG. 23, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 22.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

An Example of a Signal Processing Circuit to which the Present Disclosure is Applied FIG. 24 illustrates a signal process circuit for a transmission signal.

Referring to FIG. 24, a signal processing circuit 1000 may include scramblers 1010, modulators 1020, a layer mapper 1030, a precoder 1040, resource mappers 1050, and signal generators 1060. An operation/function of FIG. 24 may be performed, without being limited to, the processors 102 and 202 and/or the transceivers 106 and 206 of FIG. 23. Hardware elements of FIG. 24 may be implemented by the processors 102 and 202 and/or the transceivers 106 and 206 of FIG. 23. For example, blocks 1010 to 1060 may be implemented by the processors 102 and 202 of FIG. 23. Alternatively, the blocks 1010 to 1050 may be implemented by the processors 102 and 202 of FIG. 23 and the block 1060 may be implemented by the transceivers 106 and 206 of FIG. 23.

Codewords may be converted into radio signals via the signal processing circuit 1000 of FIG. 24. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 24. For example, the wireless devices (e.g., 100 and 200 of FIG. 23) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Examples of Wireless Devices to which the Present Disclosure is Applied

FIG. 25 illustrates another example of a wireless device applied to the present disclosure. The wireless device may be implemented in various forms according to a use-case/service (refer to FIG. 22).

Referring to FIG. 25, wireless devices 100 and 200 may correspond to the wireless devices 100 and 200 of FIG. 23 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 23. For example, the transceiver(s) 114 may include the one or more transceivers 106 and 206 and/or the one or more antennas 108 and 208 of FIG. 23. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 22), the vehicles (100b-1 and 100b-2 of FIG. W1), the XR device (100c of FIG. 22), the hand-held device (100d of FIG. 22), the home appliance (100e of FIG. 22), the IoT device (100f of FIG. 22), a digital broadcast terminal, a hologram device, a public safety device, an MTC device, a medicine device, a fintech device (or a finance device), a security device, a climate/environment device, the AI server/device (400 of FIG. 22), the BSs (200 of FIG. 22), a network node, etc. The wireless device may be used in a mobile or fixed place according to a use-example/service.

In FIG. 25, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 25 will be described in detail with reference to the drawings Examples of Mobile Devices to which the Present Disclosure is Applied FIG. 26 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 26, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Examples of Vehicles or Autonomous Vehicles to which the Present Disclosure is Applied FIG. 27 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 27, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 25, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a BS. Such a transmission/reception relationship is extended in the same/similar manner to signal transmission/reception between a terminal and a relay or a BS and a relay. A specific operation described as being performed by a BS in this document may be performed by its upper node in some cases. That is, it is obvious that various operations performed for communication with a terminal in a network comprising a plurality of network nodes including a BS may be performed by the BS or network nodes other than the BS. The BS may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

What is claimed is:

1. A method of receiving a group wake up signal (GWUS) by a user equipment (UE) in a wireless communication system, the method comprising:
   receiving GWUS resource configuration information; and
   monitoring the GWUS based on the GWUS resource configuration information,
   wherein the GWUS resource configuration information includes first GWUS resource configuration related to a discontinuous reception (DRX) type, second GWUS resource configuration related to an extended DRX (eDRX)-short type, and third GWUS resource configuration related to an eDRX-long type,
   wherein the eDRX-short type is related to an eDRX operation that a time gap can be configured to 40 ms or 240 ms, and
   wherein the eDRX-long type is related to the eDRX operation that the time gap can be configured to 1 s or 2 s.

2. The method of claim 1,
   wherein the configuration information is signaled as a higher layer signal having an independent field for each of the first GWUS resource and the second GWUS resource.

3. The method of claim 1,
   wherein the first WUS configuration is configured not to be applied to the UE having a time gap of the size of 1 s or 2 s,
   wherein the time gap is a time interval from the end of the WUS resource to the a paging occasion (PO).

4. A method of transmitting a group wake up signal (GWUS) by a base station (BS) in a wireless communication system, the method comprising:
   transmitting GWUS resource configuration information; and
   transmitting the GWUS based on the GWUS resource configuration information,
   wherein the GWUS resource configuration information includes first GWUS resource configuration related to a discontinuous reception (DRX) type, second GWUS resource configuration related to an extended DRX (eDRX)-short type, and third GWUS resource configuration related to an eDRX-long type,
   wherein the eDRX-short type is related to an eDRX operation that a time gap can be configured to 40 ms or 240 ms, and
   wherein the eDRX-long type is related to the eDRX operation that the time gap can be configured to 1 s or 2 s.

5. A user equipment (UE) for receiving a group wake up signal (GWUS) in a wireless communication system, the UE comprising:
   a radio frequency (RF) transceiver; and
   a processor connected to the RF transceiver,
   wherein the processor controls the RF transceiver to receive GWUS resource configuration information monitors the GWUS based on the GWUS resource configuration information, and
   wherein the GWUS resource configuration information includes first GWUS resource configuration related to a discontinuous reception (DRX) type, second GWUS resource configuration related to an extended DRX (eDRX)-short type, and third second GWUS resource configuration related to an eDRX-long type,
   wherein the eDRX-short type is related to an eDRX operation that a time gap can be configured to 40 ms or 240 ms, and
   wherein the eDRX-long type is related to the eDRX operation that the time gap can be configured to 1 s or 2 s.

* * * * *